(12) United States Patent
    Mitchell et al.

(10) Patent No.: US 10,889,480 B2
(45) Date of Patent: Jan. 12, 2021

(54) PRECISE FILL DISPENSING SYSTEM FOR AN APPLIANCE

(71) Applicant: Haier US Appliance Solutions, Inc., Wilmington, DE (US)

(72) Inventors: Alan Joseph Mitchell, Louisville, KY (US); John Keith Besore, Prospect, KY (US); Brent Alden Junge, Evansville, IN (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 97 days.

(21) Appl. No.: 16/168,879

(22) Filed: Oct. 24, 2018

(65) Prior Publication Data
    US 2020/0131016 A1    Apr. 30, 2020

(51) Int. Cl.
    *B67D 1/00*    (2006.01)
(52) U.S. Cl.
    CPC ............ *B67D 1/001* (2013.01); *B67D 1/0012* (2013.01); *B67D 1/0014* (2013.01); *F25C 2400/14* (2013.01)
(58) Field of Classification Search
    CPC ... F25C 2400/14; B67D 1/001; B67D 1/0012; B67D 1/0014
    See application file for complete search history.

(56) References Cited

U.S. PATENT DOCUMENTS

| 6,149,032 A  * | 11/2000 | Seitz    | B67D 7/18  |
|               |         |          | 222/23     |
| 6,230,761 B1 * | 5/2001  | Richard  | B65B 3/04  |
|               |         |          | 141/104    |
| 6,327,869 B1 * | 12/2001 | Shapiro  | F16K 11/07 |
|               |         |          | 141/114    |
| 2016/0377067 A1 * | 12/2016 | Saveliev | F04B 13/02 |
|               |         |          | 222/1      |

FOREIGN PATENT DOCUMENTS

| JP | 02898539 B2  | 6/1999  |
| JP | 2002350020 A | 12/2002 |
| JP | 2010281488 A | 12/2010 |

* cited by examiner

*Primary Examiner* — David J Teitelbaum
(74) *Attorney, Agent, or Firm* — Dority & Manning, P.A.

(57) ABSTRACT

A dispensing system for dispensing a precise or controlled volume of fluid to a downstream assembly of an appliance is provided. As one example, the downstream assembly may be an ice making assembly and the appliance may be refrigerator appliance. In one example aspect, a dispensing system includes a housing that defines a chamber. A piston is movable within the chamber. The dispensing system also includes a plurality of valves that may be moved between various positions to move the piston between various positions. When the piston is moved within the chamber, the piston displaces a precise or controlled volume to the downstream assembly.

20 Claims, 10 Drawing Sheets

PRECISE FILL DISPENSING SYSTEM FOR AN APPLIANCE

FIELD OF THE INVENTION

The present subject matter relates generally to consumer appliances, such as e.g., refrigerator appliances, and more particularly to precise fill dispensing systems for consumer appliances.

BACKGROUND OF THE INVENTION

Refrigerator appliances generally include a cabinet that defines one or more chilled chambers for receipt of food articles for storage. Typically, one or more doors are rotatably hinged to the cabinet to permit selective access to food items stored in the chilled chamber. Further, refrigerator appliances commonly include ice making assemblies mounted within an icebox on one of the doors or in a freezer compartment. The ice is stored in a storage bin and may be accessible from within the freezer chamber or may be discharged through a dispenser recess defined on a front of the refrigerator door.

Ice making assemblies generally require accurate water fill volumes. That is, ice making assemblies require precise amounts of water so that ice cubes can be formed. Conventionally, flow control devices have been used to deliver a volume of water to the ice making assembly. The flow control device is typically positioned along a supply conduit that fluidly connects a water supply and the ice making assembly. The volume of water dispensed to the ice making assembly is controlled by the "on" time of the flow control device. In other instances, a flow control meter may be used to meter the volume of water dispensed to the ice making assembly. Such conventional approaches are not very accurate and thus have proved to be unsatisfactory.

Accordingly, a dispensing system for an appliance that is operable to dispense a precise or controlled volume of water to a downstream assembly, such as e.g., an ice making assembly of a refrigerator appliance, would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a dispensing system for dispensing fluid to a downstream assembly of an appliance is provided. The dispensing system includes a housing defining a chamber. The dispensing system also includes a piston movable within the chamber of the housing between a first position and a second position, the piston fluidly separating a first reservoir and a second reservoir of the chamber. Further, the dispensing system includes a first inlet conduit in fluid communication with a water supply and the first reservoir of the chamber. The dispensing system also includes a first valve positioned along the first inlet conduit and movable between an open position and a closed position, the first valve configured to selectively allow fluid to flow from the water supply to the first reservoir of the chamber. The dispensing system further includes a second inlet conduit in fluid communication with the water supply and the second reservoir of the chamber. Moreover, the dispensing system includes a second valve positioned along the second inlet conduit and movable between an open position and a closed position, the second valve configured to selectively allow fluid to flow from the water supply to the second reservoir of the chamber. The dispensing system also includes a first outlet conduit in fluid communication with the first reservoir of the chamber and the downstream assembly. In addition, the dispensing system includes a third valve positioned along the first outlet conduit and movable between an open position and a closed position, the third valve configured to selectively allow fluid to flow from the first reservoir to the downstream assembly. Furthermore, the dispensing system includes a second outlet conduit in fluid communication with the second reservoir of the chamber and the downstream assembly. The dispensing system further includes a fourth valve positioned along the second outlet conduit and movable between an open position and a closed position, the fourth valve configured to selectively allow fluid to flow from the second reservoir to the downstream assembly.

In another exemplary embodiment, a dispensing system for dispensing fluid to a downstream assembly of an appliance is provided. The dispensing system includes a housing defining a chamber. The dispensing system also includes a piston movable within the chamber of the housing between a first position and a second position, the piston fluidly separating a first reservoir and a second reservoir of the chamber. Further, the dispensing system includes an inlet supply conduit in fluid communication with a water supply. The dispensing system also includes a first inlet conduit and a second inlet conduit. Moreover, the dispensing system includes an inlet valve in fluid communication with the inlet supply conduit and movable between a first open position and a second open position, wherein in the first open position the inlet valve selectively allows fluid to flow from the water supply to the first reservoir along the first inlet conduit, and wherein in the second open position the inlet valve selectively allows fluid to flow from the water supply to the second reservoir along the second inlet conduit. Moreover, the dispensing system includes an outlet supply conduit in fluid communication with the downstream assembly. In addition, the dispensing system includes a first outlet conduit in fluid communication with the first reservoir of the chamber and a second outlet conduit in fluid communication with the second reservoir of the chamber. In addition, the dispensing system includes an outlet valve in fluid communication with the outlet supply conduit and movable between a first open position and a second open position, and wherein in the first open position the outlet valve selectively allows fluid to flow from the first reservoir to the downstream assembly, and wherein in the second open position the outlet valve selectively allows fluid to flow from the second reservoir to the downstream assembly.

In yet another exemplary embodiment, a dispensing system for dispensing fluid to a downstream assembly of an appliance is provided. The dispensing system defines an axial direction. The dispensing system includes a housing defining a chamber and a piston movable within the chamber of the housing between a fill position and a discharge position along the axial direction. Moreover, the dispensing system includes an inlet supply conduit in fluid communication with a water supply. Further, the dispensing system includes a water fill reservoir in fluid communication with the water supply via the inlet supply conduit and with the chamber of the housing. In addition, the dispensing system includes a water valve positioned along the inlet supply conduit and movable between a closed position and an open position, the water valve configured to allow fluid to flow from the water supply to the water fill reservoir when in the open position. The dispensing system also includes an outlet supply conduit in fluid communication with the chamber of the housing and the downstream assembly. Furthermore, the dispensing system includes a drive motor operatively coupled with the piston for driving the piston from the fill position to the discharge position along the axial direction such that fluid is dispensed from the chamber to the downstream assembly and for moving the piston from the discharge position to the fill position.

In a further exemplary embodiment, a dispensing system for dispensing fluid to a downstream assembly of an appliance is provided. The dispensing system includes an expansion tank defining an interior volume containing a flexible bladder, the flexible bladder defining a water chamber having an inlet and an outlet. The dispensing system also includes an expansion mechanism disposed within the interior volume of the expansion tank and operable to allow for expansion of water into the water chamber. Further, the dispensing system includes an inlet supply conduit in fluid communication with a water supply and the inlet of the water chamber. Moreover, the dispensing system includes an inlet valve positioned along the inlet supply conduit and movable between a closed position and an open position, the inlet valve configured to allow fluid to flow from the water supply to the water chamber when in the open position. In addition, the dispensing system includes an outlet supply conduit in fluid communication with the outlet of the water chamber and the downstream assembly. The dispensing system also includes an outlet valve positioned along the outlet supply conduit and movable between a closed position and an open position, the outlet valve configured to allow fluid to flow from the water chamber to the downstream assembly when in the open position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
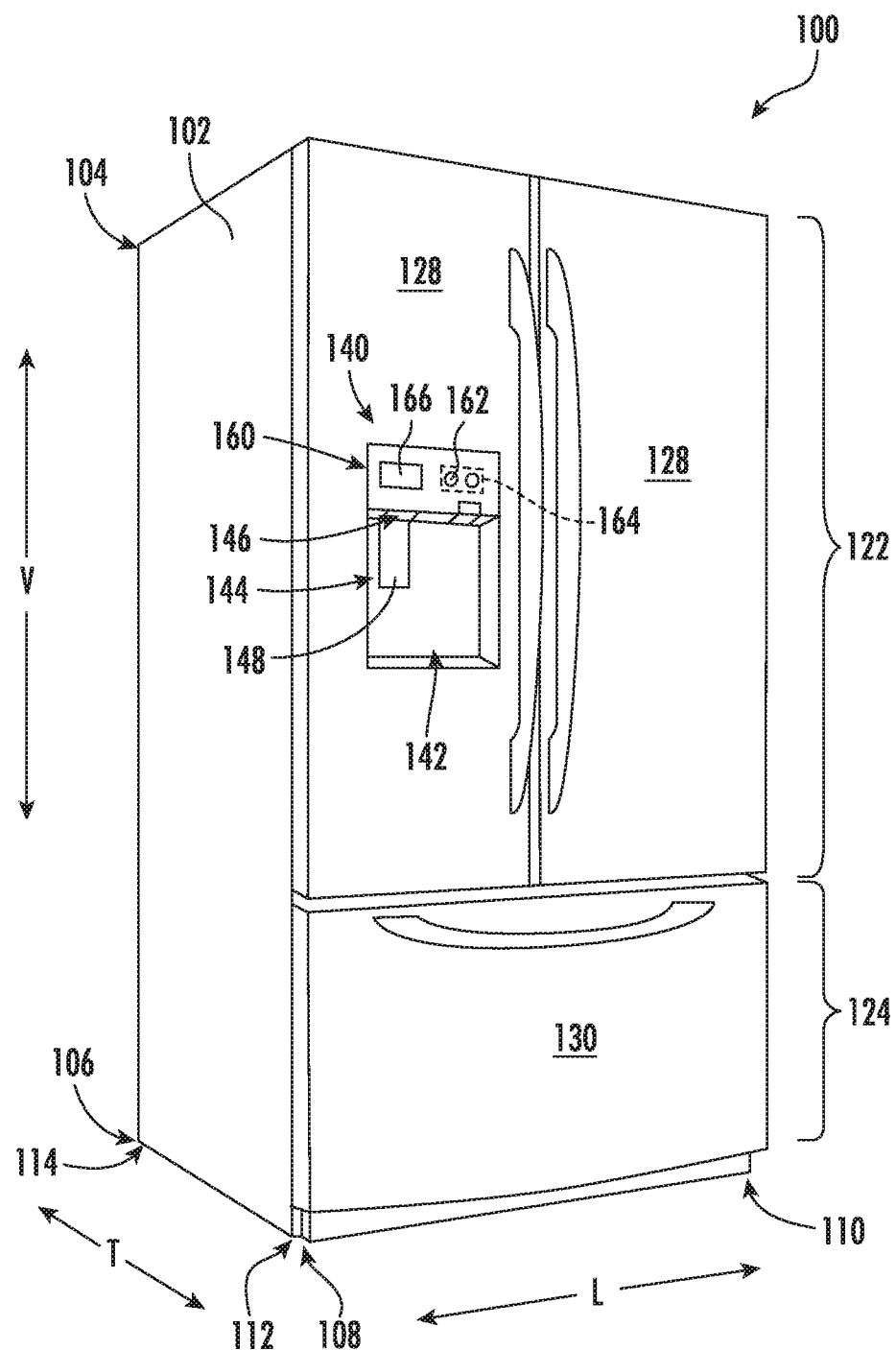
FIG. 1 provides a perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. However, the inventive aspects of the present disclosure apply to other types and styles of refrigerator appliances, such as e.g., a top mount refrigerator appliance, a side-by-side style refrigerator appliance, a single door refrigerator appliance, etc. Consequently, the description set forth herein is for illustrative purposes only and is not intended to be limiting in any aspect to any particular configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
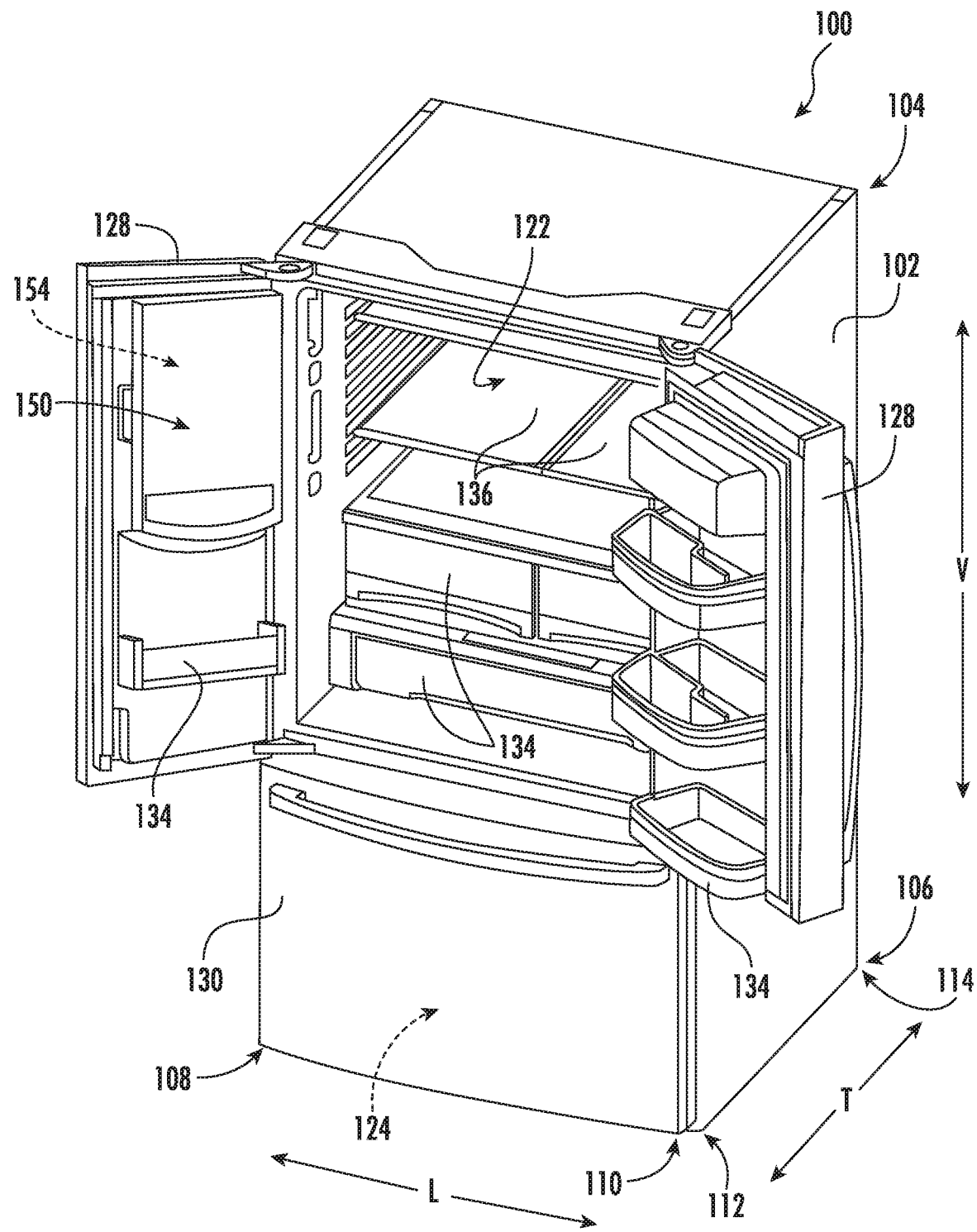
FIG. 2 provides a perspective view of the refrigerator appliance of FIG. 1 and depicts the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, as shown, refrigerator appliance 100 includes a dispensing assembly 140. Dispensing assembly 140 is generally configured for dispensing liquid water and/or ice. Dispensing assembly 140 and its various components may be positioned at least in part within a dispenser recess 142 defined on one of refrigerator doors 128. In this regard, dispenser recess 142 is defined at front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the depicted embodiment, dispenser recess 142 is positioned at a level that approximates the chest level of an adult user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. In contrast, inside refrigerator appliance 100, refrigerator door 128 may define an icebox 150 (FIGS. 2 and 3) housing an icemaker and an ice storage bin 152 that are configured to supply ice to dispenser recess 142. In this regard, for example, icebox 150 may define an ice making chamber 154 for housing an ice making assembly, a storage mechanism, and a dispensing mechanism.

As further shown in FIG. 1, refrigerator appliance 100 includes a control panel 160. Control panel 160 includes one or more selector inputs 162, such as e.g., knobs, buttons, touchscreen interfaces, etc. Selector inputs 162 may include a water dispensing button and an ice-dispensing button, e.g., for selecting a desired mode of operation such as crushed or non-crushed ice. In addition, selector inputs 162 may be used to specify a fill volume or method of operating dispensing assembly 140. In this regard, inputs 162 may be in communication with a processing device or controller 164. Control signals generated in or by controller 164 operate refrigerator appliance 100 and dispensing assembly 140 in response to selector inputs 162. Additionally, a display 166, such as an indicator light or a screen, may be provided on control panel 160. Display 166 may be in communication with controller 164 and may display information in response to signals from controller 164. Further, as will be described herein, controller 164 may be communicatively coupled with other components of refrigerator appliance 100.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Figure 3:
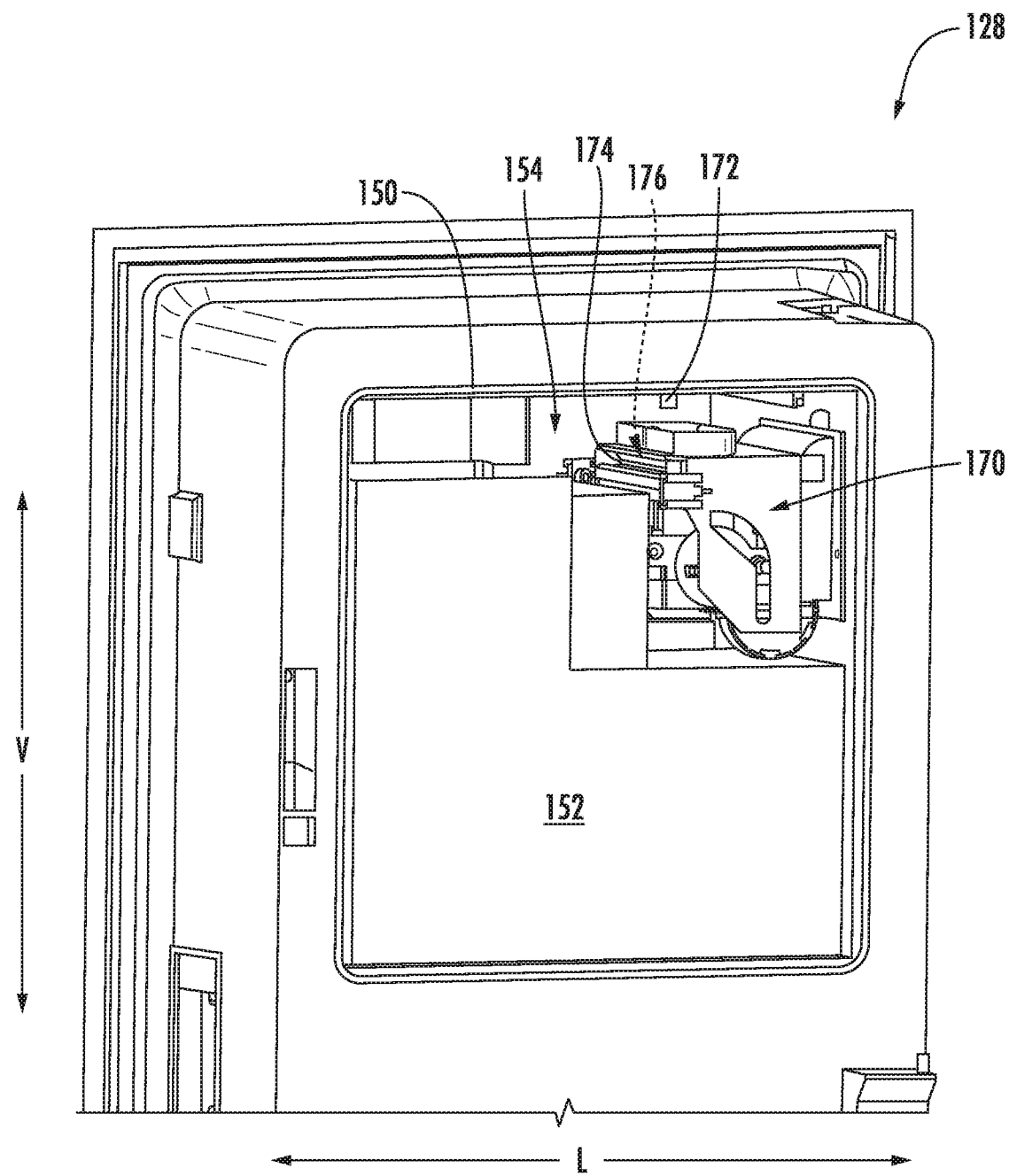
FIG. 3 provides a perspective view of an icebox and ice making assembly of the refrigerator appliance of FIG. 1.

FIG. 3 provides a perspective view of an icebox and ice making assembly 170 of refrigerator appliance 100. As illustrated, ice making assembly 170 is mounted on or to icebox 150 within ice making chamber 154 and is configured for receiving a flow of water from a water supply conduit 172. In this manner, ice making assembly 170 is generally configured for freezing the water to form ice cubes which may be stored in storage bin 152 and dispensed through discharging outlet 146 (FIG. 1) by dispensing assembly 140 (FIG. 1). It should be appreciated that ice making assembly 170 is described herein for explaining inventive aspects of the present subject matter and that variations and modifications may be made to ice making assembly 170 while remaining within the scope and spirit of the present subject matter. For example, in some alternative embodiments, ice making assembly 170 may be positioned within freezer chamber 124 of refrigerator appliance 100 and may have any other suitable configuration.

As depicted in FIG. 3, ice making assembly 170 includes a resilient mold 174 that defines a mold cavity 176. In general, resilient mold 174 is positioned below water supply conduit 172 for receiving the gravity-assisted flow of water from water supply conduit 172. Resilient mold 174 may be constructed from any suitable resilient material that may be deformed to release ice cubes after formation. For example, according to the illustrated embodiment, resilient mold 174 is formed from silicone or another suitable hydrophobic, food-grade, and resilient material. Generally, water supply conduit 172 is configured for refilling resilient mold 174 (which may include multiple mold cavities 176) to a predetermined level. In embodiments in which resilient mold 174 includes multiple mold cavities 176, water supply conduit 172 may supply a precise amount of water to fill the cavities 176 evenly and without overflowing any of the cavities 176. In accordance with exemplary aspects of the present subject matter, a precise fill dispensing assembly may be provided upstream of ice making assembly 170 to provide fixed or controlled volume of water to ice making assembly 170.

Figure 4:
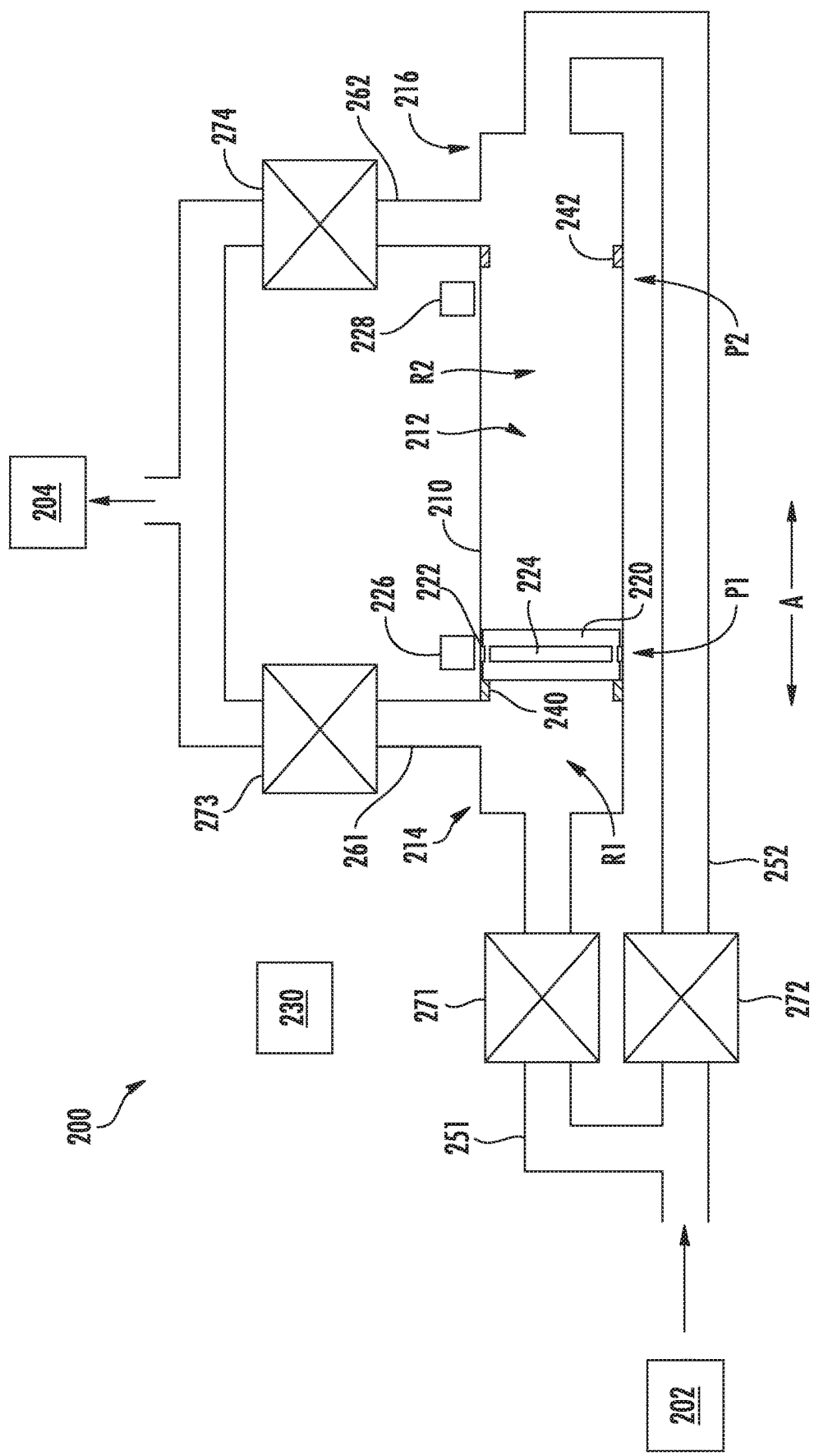
FIG. 4 provides a schematic view of one exemplary embodiment of a precise fill dispensing system according to an exemplary embodiment of the present subject matter and depicts a piston of the system in a first position.
Figure 5:
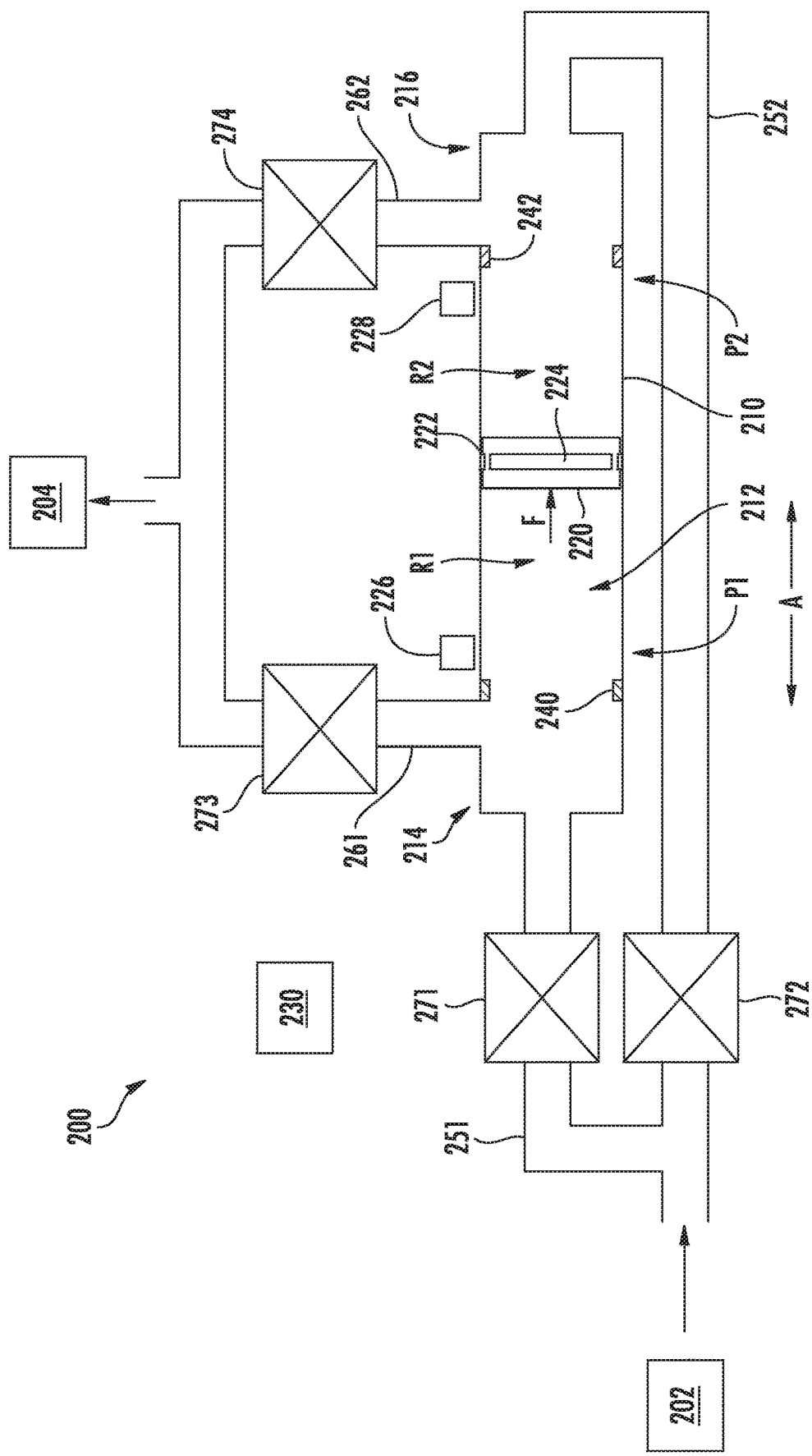
FIG. 5 provides a schematic view of the precise fill dispensing system of FIG. 4 and depicts the piston moving between the first position and a second position.
Figure 6:
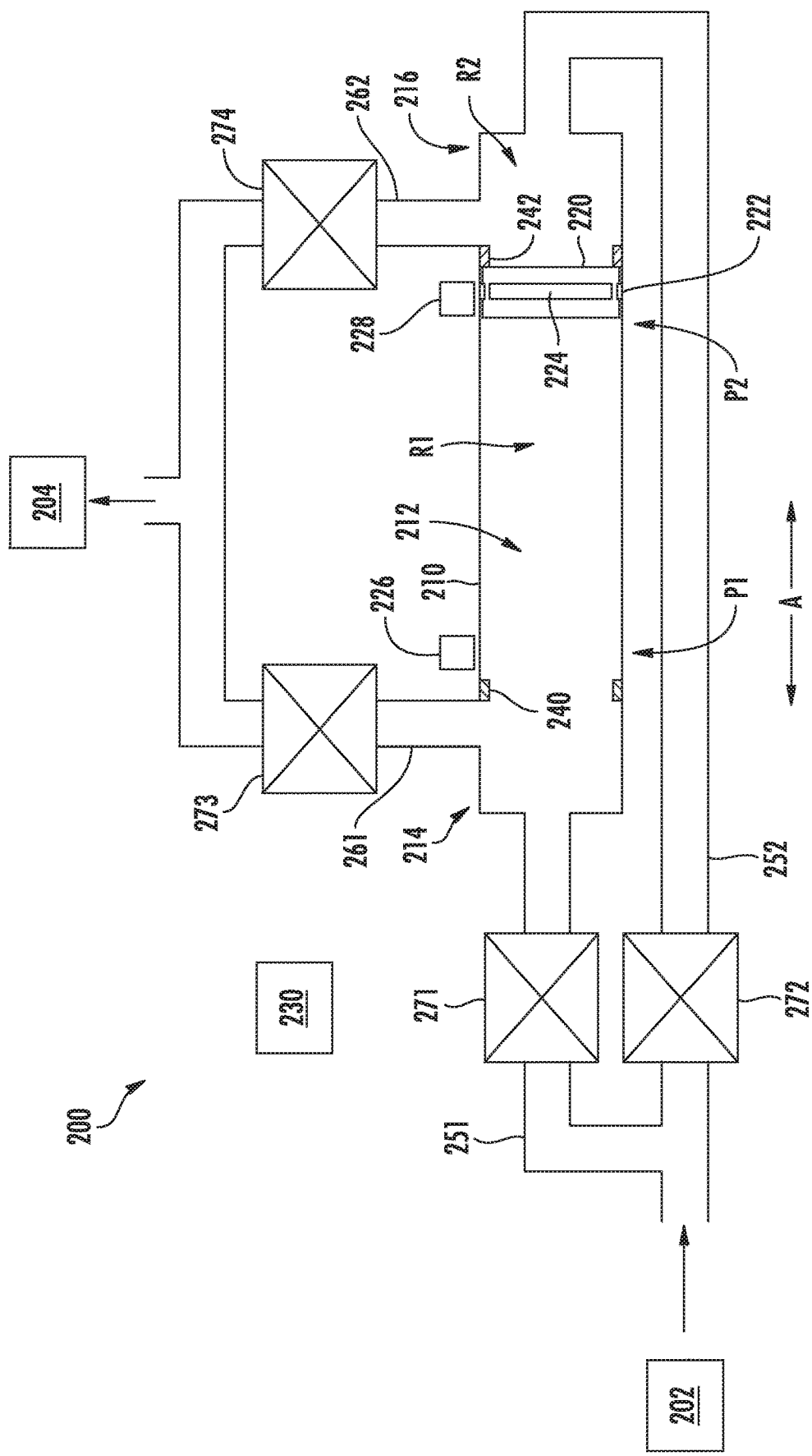
FIG. 6 provides a schematic view of the precise fill dispensing system of FIG. 4 and depicts the piston in the second position.

FIGS. 4, 5, and 6 provide various views of one exemplary embodiment of a precise fill dispensing system 200 according to an exemplary embodiment of the present subject matter. Generally, dispensing system 200 is operable to dispense a precise or controlled volume of water from a water supply 202 to a downstream assembly 204. For instance, dispensing system 200 may be employed to deliver a precise or controlled volume of water from a water supply line (i.e., the water supply) to ice making assembly 170 of FIG. 3 (i.e., the downstream assembly) of refrigerator appliance 100 (FIG. 1). However, as will be appreciated, the exemplary dispensing system 200 may be employed to deliver a precise or controlled volume of water to other downstream assemblies of an appliance, such as e.g., dispensing assembly 140 of refrigerator appliance 100 (FIG. 1), a reservoir of a coffee brewing system, etc. Dispensing system 200 may be located in any suitable location within an appliance, e.g., upstream of ice making assembly 170 within door 128 of refrigerator appliance 100 (FIGS. 1 and 3).

As shown, dispensing system 200 includes a cylinder or housing 210 defining a chamber 212. For this embodiment, chamber 212 of housing 210 is cylindrical. Chamber 212 extends between a first end 214 and a second end 216, e.g., along an axial direction A. Dispensing system 200 also includes a piston 220 movable within chamber 212 of housing 210 between a first position P1 and a second position P2. The stroke of piston 220 is the axial distance traveled by piston 220 between the first and second positions P1, P2. In FIG. 4, piston 220 is shown in the first position P1. In FIG. 5, piston 220 is shown between the first and second positions P1, P2. In FIG. 6, piston 220 is shown in the second position P2. Notably, piston 220 fluidly separates chamber 212 into a first reservoir R1 and a second reservoir R2. Piston 220 has a seal 222 that engages the inner walls defining chamber 212 to seal and fluidly separate first reservoir R1 and second reservoir R2 of chamber 212. For this embodiment, seal 222 is an annular elastomer seal. For instance, seal 222 may be an O-ring formed of a natural or synthetic polymer material, such as e.g., rubber. In some embodiments, piston 220 may include multiple seals 222, e.g., spaced from one another along the axial direction A. As piston 220 moves within chamber 212 along the axial direction A, the volume of the first and second reservoirs R1, R2 change, e.g., as depicted by comparing the volumes of the first and second reservoirs R1, R2 in FIG. 4 with their respective volumes in FIG. 6.

For this embodiment, piston 220 includes a magnet 224, e.g., embedded within the body of piston 220. In this way, one or more sensors may detect the location of piston 220 (e.g., the axial location of piston 220). For instance, as shown in FIG. 4, dispensing system 200 includes a first sensor 226 positioned at or proximate the first position P1 along the axial direction A and a second sensor 228 positioned at or proximate the second position P2 along the axial direction A. First and second sensors 226, 228 are positioned outside or external to chamber 212. For instance, first and second sensors 226, 228 may be attached to an outer surface of housing 210 as shown in FIG. 4. Moreover, for this embodiment, first and second sensors 226, 228 are hall-effect sensors. First sensor 226 is operable to detect piston 220 when piston 220 in the first position P1 and second sensor 228 is operable to detect piston 220 when piston 220 in in the second position P2. More specifically, first sensor 226 is operable to detect magnet 224 of piston 220 when piston 220 in in the first position P1 and second sensor 228 is operable to detect magnet 224 of piston 220 when piston 220 in in the second position P2. A processing device or controller 230 is communicatively coupled with first and second sensors 226, 228. Controller 230 may be similarly configured as controller 164 of refrigerator appliance 100 (FIG. 1). In some embodiments, controller 230 may be controller 164. Controller 230 may receive location signals from first and second sensors 226, 228 indicating the position of piston 220. In this way, controller 230 may control various components of dispensing system 200 so that a precise or controlled volume of water may be dispensed to downstream assembly 204 as will be explained in greater detail herein.

In some alternative embodiments, dispensing system 200 may include only a single sensor for detecting the position of piston 220, such as e.g., a single hall-effect sensor. In such embodiments, the sensor may be positioned at or proximate one of the first and second positions P1, P2 along the axial direction A. Depending on the position of the sensor, the sensor is operable to detect piston 220 when piston 220 is at that position within chamber 212. As one example, if the sensor is positioned at the first position P1, e.g., the position in which first sensor 226 is located in FIG. 4, the sensor is operable to detect piston 220 when piston 220 is at the first position P1. As another example, if the sensor is positioned at the second position P2, e.g., the position in which second sensor 228 is located in FIG. 4, the sensor is operable to detect piston 220 when piston 220 is at the second position P2. In such embodiments, controller 230 may store data indicative of the time of travel of piston 220 between the first and second positions P1, P2. In this way, controller 230 may determine the position of piston 220 despite use of a single sensor.

Movement of piston 220 within chamber 212 is constrained by a pair of stops with one stop located at the first position P1 and one stop located at the second position P2. Particularly, dispensing system 200 includes a first stop 240 positioned within the first reservoir R1 of chamber 212. That is, first stop 240 is located between first end 214 of chamber 212 and piston 220. First stop 240 operable to stop piston 220 in or at the first position. Dispensing system 200 also includes a second stop 242 positioned within the second reservoir R2 of chamber 212. That is, second stop 242 is located between second end 216 of chamber 212 and piston 220. Second stop 242 is operable to stop piston 220 in or at the second position P2. Notably, the axial spacing of first and second stops 240, 242 and the axial length of piston 220 determine the stroke of piston 220. For this embodiment, first and second stops 240, 242 are formed of an elastomer material and extend annularly around and are attached to inner walls defining chamber 212. However, in alternative embodiments, first and second stops 240, 242 may be formed of any suitable rigid material, such as e.g., metal. Further, in some embodiments, first and second stops 240, 242 may be built into or formed integrally with housing 210. In such embodiments, first and second stops 240, 242 may be formed of the same material as housing 210.

As further shown in FIG. 4, dispensing system 200 includes a pair of inlet conduits that provide fluid communication between water supply 202 and chamber 212. More particularly, dispensing system 200 includes a first inlet conduit 251 in fluid communication with water supply 202 and the first reservoir R1 of chamber 212 and a second inlet conduit 252 in fluid communication with water supply 202 and the second reservoir R2 of chamber 212. Dispensing system 200 also includes a pair of outlet conduits that provide fluid communication between chamber 212 and downstream assembly 204. More specifically, dispensing system 200 includes a first outlet conduit 261 in fluid communication with first reservoir R1 of chamber 212 and downstream assembly 204 and a second outlet conduit 262 in fluid communication with the second reservoir R2 of chamber 212 and downstream assembly 204. For this embodiment, first inlet conduit 251 and first outlet conduit 261 both fluidly connect with the first reservoir R1 of chamber 212 between first end 214 and first stop 240 and second inlet conduit 252 and second outlet conduit 262 both fluidly connect with the second reservoir R2 of chamber 212 between second end 216 and second stop 242.

Dispensing system 200 also includes a number of valves. As shown in FIG. 4, dispensing system 200 includes a first valve 271 positioned along first inlet conduit 251 and movable between an open position and a closed position. First valve 271 is configured to selectively allow fluid to flow from water supply 202 to the first reservoir R1 of chamber 212, e.g., when first valve 271 is in the open position. Dispensing system 200 also includes a second valve 272 positioned along second inlet conduit 252 and movable between an open position and a closed position. Second valve 272 is configured to selectively allow fluid to flow from water supply 202 to second reservoir R2 of chamber 212, e.g., when second valve 272 is in the open position. Further, dispensing system 200 includes a third valve 273 positioned along first outlet conduit 261 and movable between an open position and a closed position. Third valve 273 is configured to selectively allow fluid to flow from the first reservoir R1 to downstream assembly 204, e.g., when third valve 273 is in the open position. In addition, dispensing system 200 includes a fourth valve 274 positioned along second outlet conduit 262 and movable between an open position and a closed position. Fourth valve 274 is configured to selectively allow fluid to flow from the second reservoir R2 to downstream assembly 204, e.g., when fourth valve 274 is in the open position.

For this embodiment, first valve 271, second valve 272, third valve 273, and fourth valve 274 are solenoid valves that are all normally closed. Further, each valve 271, 272, 273, 274 is communicatively coupled with controller 230 so that controller 230 may activate or control the valves 271, 272, 273, 274 to move from their respective closed positions to their respective open positions, or vice versa. For instance, to move one or more of the valves 271, 272, 273, 274 from the closed position to the open position, controller 230 may send an activation command to energize the valve to move from the closed position to the open position so that water may flow through the valve downstream. In contrast, controller 230 may send a close command such that the valve is no longer energized to move one or more of the valves 271, 272, 273, 274 from the open position to the closed position. In this way, the valve will prevent the flow of water through the valve.

An exemplary manner in which dispensing system 200 may dispense a precise or controlled volume of water to downstream assembly 204 will now be described. The precise fill dispense process may be initiated by controller 230 receiving a fill command signal. For instance, controller 230 may receive a fill command signal from a sensor of downstream assembly 204. As one example, downstream assembly 204 may be the ice making assembly 170 of FIG. 3. A sensor of ice making assembly 170 may indicate, via the fill command signal, that water is needed within mold cavity 176 of resilient mold 174 so that new ice cubes can be formed. After receiving the fill command signal, controller 230 receives a location signal from one or both of first and second sensors 226, 228 indicating a position of piston 220. For instance, the location signal may indicate that piston 220 is in the first position P1 or in the second position P2.

For this example, suppose that piston 220 is initially in the first position P1 as shown in FIG. 4. When piston 220 is in the first position P1, the second reservoir R2 is filled with water (e.g., from a previous cycle or from a calibration cycle in which second valve 272 is opened to allow water to flow into second reservoir R2 of chamber 212).

Once the location of piston 220 is known by controller 230, controller 230 proceeds with dispensing the water in the second reservoir R2 of chamber 212 to downstream assembly 204. Particularly, controller 230 is configured to control first valve 271 to move to the open position to allow fluid (e.g., water) to flow from water supply 202 to first reservoir R1 of chamber 212. For instance, controller 230 may send an activation signal to first valve 271 such that first valve 271 is energized thus moving the valve to the open position. When first valve 271 is moved to the open position, water flows through first valve 271 and piston 220 is moved from the first position P1 (FIG. 4) to the second position P2 (FIG. 6). As shown best in FIG. 5, the water filling into the first reservoir R1 of chamber 212 applies a force F on piston 220 in a direction toward second end 216 of chamber 212. As shown in FIG. 6, eventually, the water pressure forces piston 220 such that piston 220 engages second stop 242 at the second position P2. In addition, at or near the same time as the opening of first valve 271, controller 230 is configured to control fourth valve 274 to the open position to allow fluid (e.g., water) to flow from the second reservoir R2 of chamber 212 to downstream assembly 204. More particularly, when fourth valve 274 is moved to the open position, water may flow from the second reservoir R2 of chamber 212 along the second outlet conduit 262 and through the fourth valve 274 to downstream assembly 204. The opening of the first and fourth valves 271, 274 allows a fixed volume of water to be displaced from chamber 212 to downstream assembly 204. Notably, when first and fourth valves 271, 274 are moved to the open position, second and third valves 272, 273 remain in the closed position. In some example embodiments, a volume between about 10-20 cubic centimeters (CCs) may be dispensed in a single stroke of piston 220.

For the next precise fill or to double the volume of water dispensed to downstream assembly 204, the process may be executed in reverse as explained below. Particularly, another cycle or stroke of piston 220 may be initiated by controller 230 receiving another fill command signal, e.g., from a sensor of downstream assembly 204, or the process may continue automatically as a continuation of the example above. After receiving the fill command signal or continuing with the process above, controller 230 is configured to receive a location signal from one or both of first and second sensors 226, 228 indicating a position of piston 220. For this example, piston 220 is now in the second position P2 as shown in FIG. 6. When piston 220 is in the second position P2, the first reservoir R1 is filled with water (e.g., from the previous cycle or stroke of piston 220). Moreover, if controller 230 has not done so already, controller 230 controls first valve 271 to the closed position and fourth valve 274 to the closed position. Controller 230 may close first and fourth valve 271, 274 upon receiving the location signal indicating that piston 220 is at the second position, e.g., as shown in FIG. 6.

Once the location of piston 220 is known by controller 230, controller 230 proceeds with dispensing the water in the first reservoir R1 of chamber 212 to downstream assembly 204. Particularly, controller 230 is configured to control second valve 272 to move to the open position to allow fluid (e.g., water) to flow from water supply 202 to second reservoir R2 of chamber 212. For instance, controller 230 may send an activation signal to second valve 272 such that second valve 272 is energized thus moving the valve to the open position. When second valve 272 is moved to the open position, water flows through second valve 272 and piston 220 is moved from the second position P2 (FIG. 6) to the first position P1 (FIG. 4). With reference to FIG. 5, the water filling into the second reservoir R2 of chamber 212 may apply a force on piston 220 in a direction toward first end 214 of chamber 212 (i.e., a direction opposite the arrow direction of force F in FIG. 5). As shown in FIG. 4, eventually, the water pressure forces piston 220 such that piston 220 engages first stop 240 at the first position P1. In addition, at or near the same time as the opening of second valve 272, controller 230 is configured to control third valve 273 to the open position to allow fluid (e.g., water) to flow from the first reservoir R1 of chamber 212 to downstream assembly 204. More particularly, when third valve 273 is moved to the open position, water may flow from the first reservoir R1 of chamber 212 along the first outlet conduit 261 and through the third valve 273 to downstream assembly 204. The opening of the second and third valves 272, 273 allows a fixed volume of water to be displaced from chamber 212 to downstream assembly 204. Notably, when second and third valves 272, 273 are moved to the open position, first and fourth valves 271, 274 remain in the closed position. The volume of water dispensed when piston 220 is moved from the second position P2 to the first position P1 may be the same as the volume of water dispensed when piston 220 is moved from the first position P1 to the second position P2. The precise fill process may be repeated as many times as necessary to achieve the desired volume of water.

Figure 7:
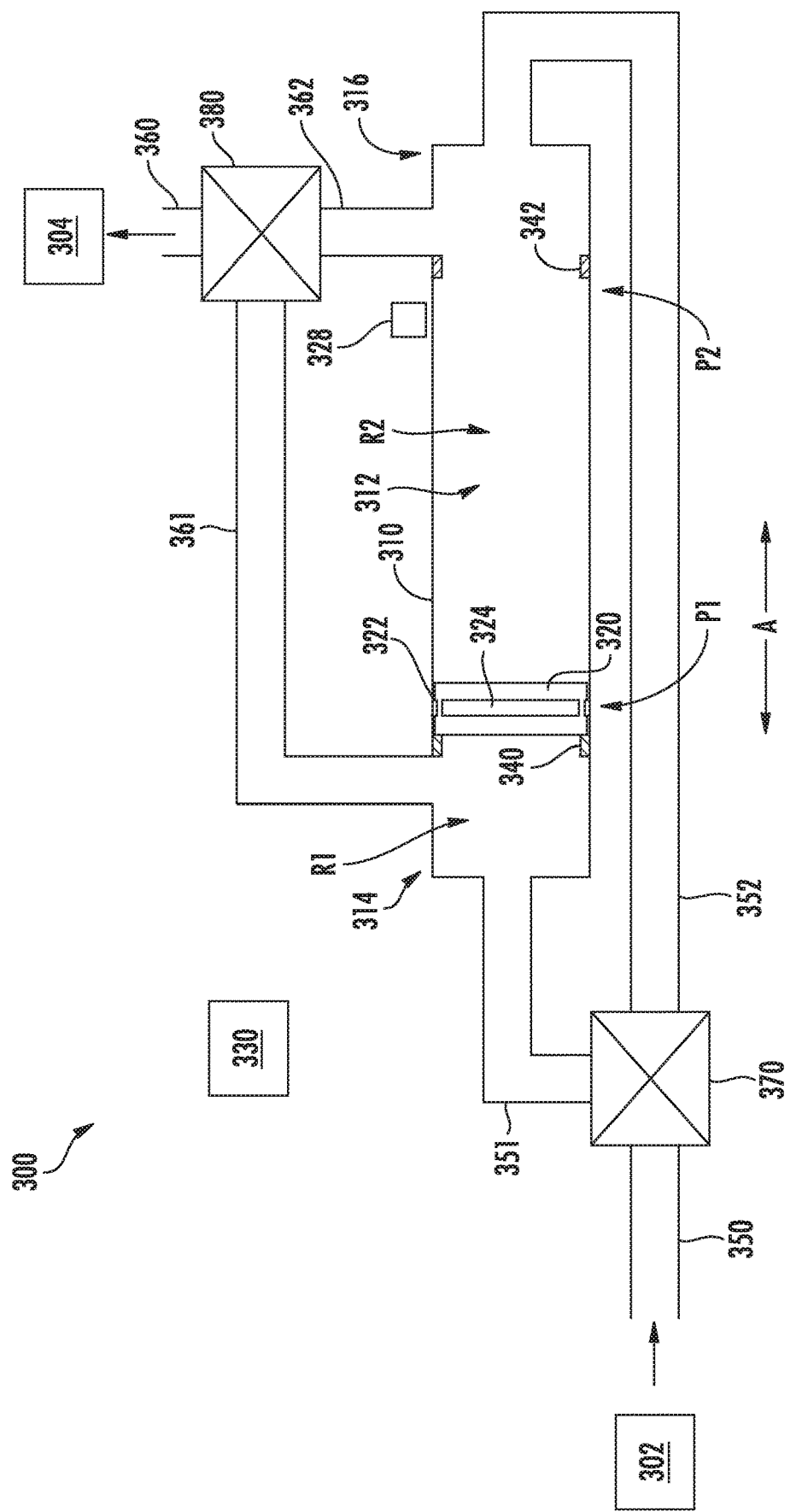
FIG. 7 provides a schematic view of another exemplary embodiment of a precise fill dispensing system according to an exemplary embodiment of the present subject matter and depicts a piston of the system in a first position.
Figure 8:
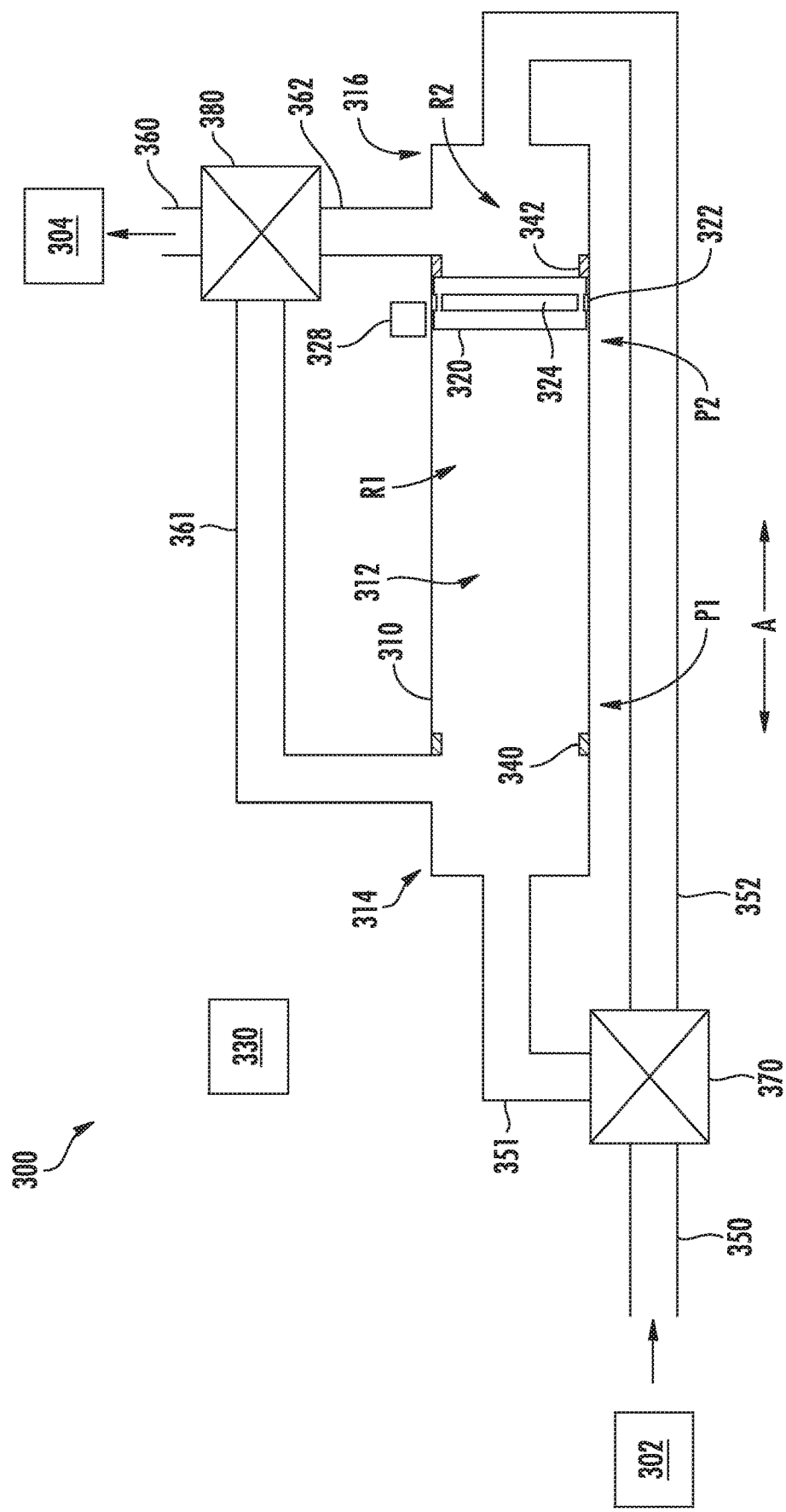
FIG. 8 provides a schematic view of the precise fill dispensing system of FIG. 7 and depicts the piston in the second position.

FIGS. 7 and 8 provide various views of another exemplary embodiment of a precise fill dispensing system 300 according to an exemplary embodiment of the present subject matter. Generally, like dispensing system 200 of FIGS. 4 through 6 described above, dispensing system 300 is operable to dispense a precise or controlled volume of water from a water supply 302 to a downstream assembly 304. For instance, dispensing system 300 may be employed to deliver a precise or controlled volume of water from a water supply line (i.e., the water supply) to ice making assembly 170 of FIG. 3 (i.e., the downstream assembly) of refrigerator appliance 100 (FIG. 1). However, as will be appreciated, the exemplary dispensing system 300 may be employed to deliver a precise or controlled volume of water to other downstream assemblies of an appliance, such as e.g., dispensing assembly 140 of refrigerator appliance 100 (FIG. 1), a reservoir of a coffee brewing system, etc. Dispensing system 300 may be located in any suitable location within an appliance, e.g., upstream of ice making assembly 170 within door 128 of refrigerator appliance 100 (FIGS. 1 and 3).

As depicted, dispensing system 300 includes a cylinder or housing 310 defining a chamber 312. For this embodiment, chamber 312 of housing 310 is cylindrical. Chamber 312 extends between a first end 314 and a second end 316, e.g., along an axial direction A. Dispensing system 300 also includes a piston 320 movable within chamber 312 of housing 310 between a first position P1 and a second position P2. The stroke of piston 320 is the axial distance traveled by piston 320 between the first and second positions P1, P2. In FIG. 7, piston 320 is shown in the first position P1. In FIG. 8, piston 320 is shown in the second position P2. Notably, piston 320 fluidly separates chamber 312 into a first reservoir R1 and a second reservoir R2. Piston 320 has a seal 322 that engages the inner walls defining chamber 312 to seal and fluidly separate first reservoir R1 and second reservoir R2 of chamber 312. For this embodiment, seal 322 is an annular elastomer seal. For instance, seal 322 may be an O-ring formed of a natural or synthetic polymer material, such as e.g., rubber. In some embodiments, piston 320 may include multiple seals 322, e.g., spaced from one another along the axial direction A. As piston 320 moves within chamber 312 along the axial direction A, the volume of the first and second reservoirs R1, R2 change, e.g., as depicted by comparing the volumes of the first and second reservoirs R1, R2 in FIG. 7 with their respective volumes in FIG. 8.

For this embodiment, piston 320 includes a magnet 324, e.g., embedded within the body of piston 320. In this way, one or more sensors may detect the location of piston 320 (e.g., the axial location of piston 320). For instance, as shown in FIG. 7, dispensing system 300 includes a sensor 328 positioned at or proximate the second position P2 along the axial direction A. Sensor 328 is positioned outside or external to chamber 312 and may attached to an outer surface of housing 310. For this embodiment, sensor 328 is a hall-effect sensor. Sensor 328 is operable to detect piston 320 when piston 320 in in the second position P2. Sensor 328 is operable to detect magnet 324 of piston 320 when piston 320 in in the second position P2. A processing device or controller 330 is communicatively coupled with sensor 328. Controller 330 may be configured in a similar manner as controller 164 of refrigerator appliance 100 (FIG. 1). In some embodiments, controller 330 may be controller 164. Controller 330 may receive location signals from sensor 328 indicating the position of piston 320, e.g., whether piston 320 is at second position P2. In such embodiments, controller 330 may store data indicative of the time of travel of piston 320 between the first and second positions P1, P2. In this way, controller 330 may determine the position of piston 320 despite use of a single sensor. For instance, controller 330 may determine when piston 320 is in the first position based on a known or predetermined time of travel between the second position P2 and the first position P1. Accordingly, controller 330 may control various components of dispensing system 300 so that a precise or controlled volume of water may be dispensed to downstream assembly 304 as will be explained in greater detail herein.

In some alternative embodiments, dispensing system 300 may include multiple sensors for detecting the position of piston 320, such as e.g., two hall-effect sensors, including one positioned at the first position P1 along the axial direction A and one positioned at the second position P2 along the axial direction A. For instance, the sensors may be positioned similar to the first and second sensors 226, 228 in FIGS. 4, 5, and 6. Further, the sensors may be configured and may be operable in a similar manner to the sensors 226, 228 of FIGS. 4, 5, and 6.

Movement of piston 320 within chamber 312 is constrained by a pair of stops with one stop located at the first position P1 and one stop located at the second position P2. Particularly, dispensing system 300 includes a first stop 340 positioned within the first reservoir R1 of chamber 312. That is, first stop 340 is located between first end 314 of chamber 312 and piston 320. First stop 340 operable to stop piston 320 in or at the first position. Dispensing system 300 also includes a second stop 342 positioned within the second reservoir R2 of chamber 312. That is, second stop 342 is located between second end 316 of chamber 312 and piston 320. Second stop 342 is operable to stop piston 320 in or at the second position P2. Notably, the axial spacing of first and second stops 340, 342 and the axial length of piston 320 determine the stroke of piston 320. For this embodiment, first and second stops 340, 342 are formed of an elastomer material and extend annularly around and are attached to inner walls defining chamber 312. However, in alternative embodiments, first and second stops 340, 342 may be formed of any suitable rigid material, such as e.g., metal. Further, in some embodiments, first and second stops 340, 342 may be built into or formed integrally with housing 310. In such embodiments, first and second stops 340, 342 may be formed of the same material as housing 310.

As further shown in FIGS. 7 and 8, dispensing system 300 includes a various inlet conduits that provide fluid communication between water supply 302 and chamber 312. More particularly, dispensing system 300 includes an inlet supply conduit 350 in fluid communication with water supply 302. Dispensing system 300 also includes a first inlet conduit 351 and a second inlet conduit 352. Further, dispensing system 300 includes an inlet valve 370 in fluid communication with inlet supply conduit 350, first inlet conduit 351, and second inlet conduit 352. For this embodiment, inlet valve 370 is movable between a first open position and a second open position. In the first open position, inlet valve 370 selectively allows fluid to flow from water supply 302 to the first reservoir R1 of chamber 312 along the first inlet conduit 351 and prevents fluid from flowing from water supply 302 to the second reservoir R2 of chamber 312 along the second inlet conduit 352. In the second open position, inlet valve 370 selectively allows fluid to flow from water supply 302 to the second reservoir R2 of chamber 312 along the second inlet conduit 352 and prevents fluid from flowing from water supply 302 to the first reservoir R1 of chamber 312 along the first inlet conduit 351. In some embodiments, inlet valve 370 may also be movable to a closed position. Further, in some embodiments, inlet valve 370 may be a three-way valve. In some embodiments, inlet valve 370 may be a multiport rotary valve.

Dispensing system 300 includes a various outlet conduits that provide fluid communication between chamber 312 and downstream assembly 304. More particularly, dispensing system 300 includes an outlet supply conduit 360 in fluid communication with downstream assembly 304. Dispensing system 300 also includes a first outlet conduit 361 in fluid communication with the first reservoir R1 of chamber 312 and a second outlet conduit 362 in fluid communication with the second reservoir R2 of chamber 312. Moreover, dispensing system 300 includes an outlet valve 380 in fluid communication with outlet supply conduit 360, first outlet conduit 361, and second outlet conduit 362. Outlet valve 380 is movable between a first open position and a second open position. In the first open position, outlet valve 380 selectively allows fluid to flow from the first reservoir R1 of chamber 312 to downstream assembly 304 and prevents fluid from flowing from the second reservoir R2 of chamber 312 to downstream assembly 304. In the second open position, outlet valve 380 selectively allows fluid to flow from the second reservoir R2 of chamber 312 to downstream assembly 304 and prevents fluid from flowing from the first reservoir R1 of chamber 312 to downstream assembly 304. In some embodiments, outlet valve 380 may also be movable to a closed position. Further, in some embodiments, outlet valve 380 may be a three-way valve. In some embodiments, outlet valve 380 may be a multiport rotary valve.

For this embodiment, when inlet valve 370 is moved to the first open position in which inlet valve 370 selectively allows fluid to flow from water supply 302 to the first reservoir R1 of chamber 312 along the first inlet conduit 351, outlet valve 380 is set or moved to the second open position in which outlet valve 380 prevents fluid (e.g., water) from flowing from the first reservoir R1 of chamber 312 to downstream assembly 304. Conversely, when inlet valve 370 is moved to the second open position in which inlet valve 370 selectively allows fluid to flow from water supply 302 to the second reservoir R2 of chamber 312 along second inlet conduit 352, outlet valve 380 is set or moved to the first open position in which outlet valve 380 prevents fluid (e.g., water) from flowing from the second reservoir R2 of chamber 312 to downstream assembly 304. Both inlet and outlet valves 370, 380 are communicatively coupled with controller 330 so that controller 330 may activate or control the valves 370, 380 to move them between their respective positions. Moreover, for this embodiment, first inlet conduit 351 and first outlet conduit 361 both fluidly connect with the first reservoir R1 of chamber 312 between first end 314 and first stop 340 and second inlet conduit 352 and second outlet conduit 362 both fluidly connect with the second reservoir R2 of chamber 312 between second end 316 and second stop 342.

An exemplary manner in which dispensing system 300 may dispense a precise or controlled volume of water to downstream assembly 304 will now be described. The precise fill dispense process may be initiated by controller 330 receiving a fill command signal. For instance, controller 330 may receive a fill command signal from a sensor of downstream assembly 304. As one example, downstream assembly 304 may be the ice making assembly 170 of FIG. 3. A sensor of ice making assembly 170 may indicate, via the fill command signal, that water is needed within mold cavity 176 of resilient mold 174 so that new ice cubes can be formed. After receiving the fill command signal, controller 330 receives a location signal from sensor 328 indicating a position of piston 320. For instance, the location signal may indicate that piston 320 is in the first position P1 or in the second position P2.

For this example, suppose that piston 320 is initially in the first position P1 as shown in FIG. 7. When piston 320 is in the first position P1, the second reservoir R2 is filled with water as inlet valve 370 is in the second open position (a position in which inlet valve 370 selectively allows fluid to flow from water supply 302 to the second reservoir R2 of chamber 312 along the second inlet conduit 352 and prevents fluid from flowing from water supply 302 to the first reservoir R1 of chamber 312 along the first inlet conduit 351).

Once the location of piston 320 is known by controller 330, controller 330 proceeds with dispensing the water in the second reservoir R2 of chamber 312 to downstream assembly 304. Particularly, controller 330 is configured to control inlet valve 370 to move to the first open position to allow fluid (e.g., water) to flow from water supply 302 to first reservoir R1 of chamber 312 along the first inlet conduit 351 and to prevent fluid from flowing from water supply 302 to the second reservoir R2 of chamber 312 along the second inlet conduit 352. For instance, controller 330 may send an activation signal to inlet valve 370 such that inlet valve 370 is moved from the second open position to the first open position. When inlet valve 370 is moved to the first open position, water flows through inlet valve 370 and to the first reservoir R1 of chamber 312. When this occurs, piston 320 is moved from the first position P1 (FIG. 7) to the second position P2 (FIG. 8). The water filling into the first reservoir R1 of chamber 312 applies a force on piston 320 in a direction toward second end 316 of chamber 312 along the axial direction A. As shown in FIG. 8, eventually, the water pressure forces piston 320 to engage second stop 342 at the second position P2.

In addition, at or near the same time as moving inlet valve 370 from the second open position to the first open position, controller 330 is configured to control outlet valve 380 to move from the first open position to the second open position to allow fluid (e.g., water) to flow from the second reservoir R2 of chamber 312 to downstream assembly 304 and to prevent fluid from flowing from the first reservoir R1 of chamber 312 to downstream assembly 304. When inlet valve 370 is moved from the second open position to the first open position and outlet valve 380 is moved from the first open position to the second open position, dispensing system 300 dispenses a fixed volume of water to downstream assembly 304. In some example embodiments, a volume between about 10-20 cubic centimeters (CCs) may be dispensed in a single stroke of piston 320.

For the next precise fill or to double the volume of water dispensed to downstream assembly 304, the process may be executed in reverse as explained below. Particularly, another cycle or stroke of piston 320 may be initiated by controller 330 receiving another fill command signal, e.g., from a sensor of downstream assembly 304, or the process may continue automatically as a continuation of the example above. After receiving the fill command signal or continuing with the process above, controller 330 is configured to receive a location signal from sensor 328 indicating a position of piston 320 (e.g., the piston 320 is located at the second position P2), or alternatively, a predetermined time may elapse that accounts for the time of travel of piston 320 between the first and second positions P1, P2. Controller 330 may assume that piston 320 is in the second position after the predetermined time has elapsed.

Once the location of piston 320 is known by controller 330, controller 330 proceeds with dispensing the water in the first reservoir R1 of chamber 312 to downstream assembly 304. Particularly, controller 330 is configured to control inlet valve 370 to move to the second open position to allow fluid (e.g., water) to flow from water supply 302 to second reservoir R2 of chamber 312 along the second inlet conduit 352 and to prevent fluid from flowing from water supply 302 to the first reservoir R1 of chamber 312 along the first inlet conduit 351. For instance, controller 330 may send an activation signal to inlet valve 370 such that inlet valve 370 is moved from the first open position to the second open position. When inlet valve 370 is moved to the second open position, water flows through inlet valve 370 and to the second reservoir R2 of chamber 312. When this occurs, piston 320 is moved from the second position P2 (FIG. 8) to the first position P1 (FIG. 7). The water filling into the second reservoir R2 of chamber 312 applies a force on piston 320 in a direction toward first end 314 of chamber 312 along the axial direction A. As shown in FIG. 7, eventually, the water pressure forces piston 320 to engage first stop 340 at the first position P1.

Further, at or near the same time as moving inlet valve 370 from the first open position to the second open position, controller 330 is configured to control outlet valve 380 to move from the second open position to the first open position to allow fluid (e.g., water) to flow from the first reservoir R1 of chamber 312 to downstream assembly 304 and to prevent fluid from flowing from the second reservoir R2 of chamber 312 to downstream assembly 304. When inlet valve 370 is moved from the first open position to the second open position and outlet valve 380 is moved from the second open position to the third open position, dispensing system 300 dispenses a fixed volume of water to downstream assembly 304. The volume of water dispensed when piston 320 is moved from the second position P2 to the first position P1 may be the same as the volume of water dispensed when piston 320 is moved from the first position P1 to the second position P2. The precise fill process may be repeated as many times as necessary to achieve the desired volume of water.

Figure 9:
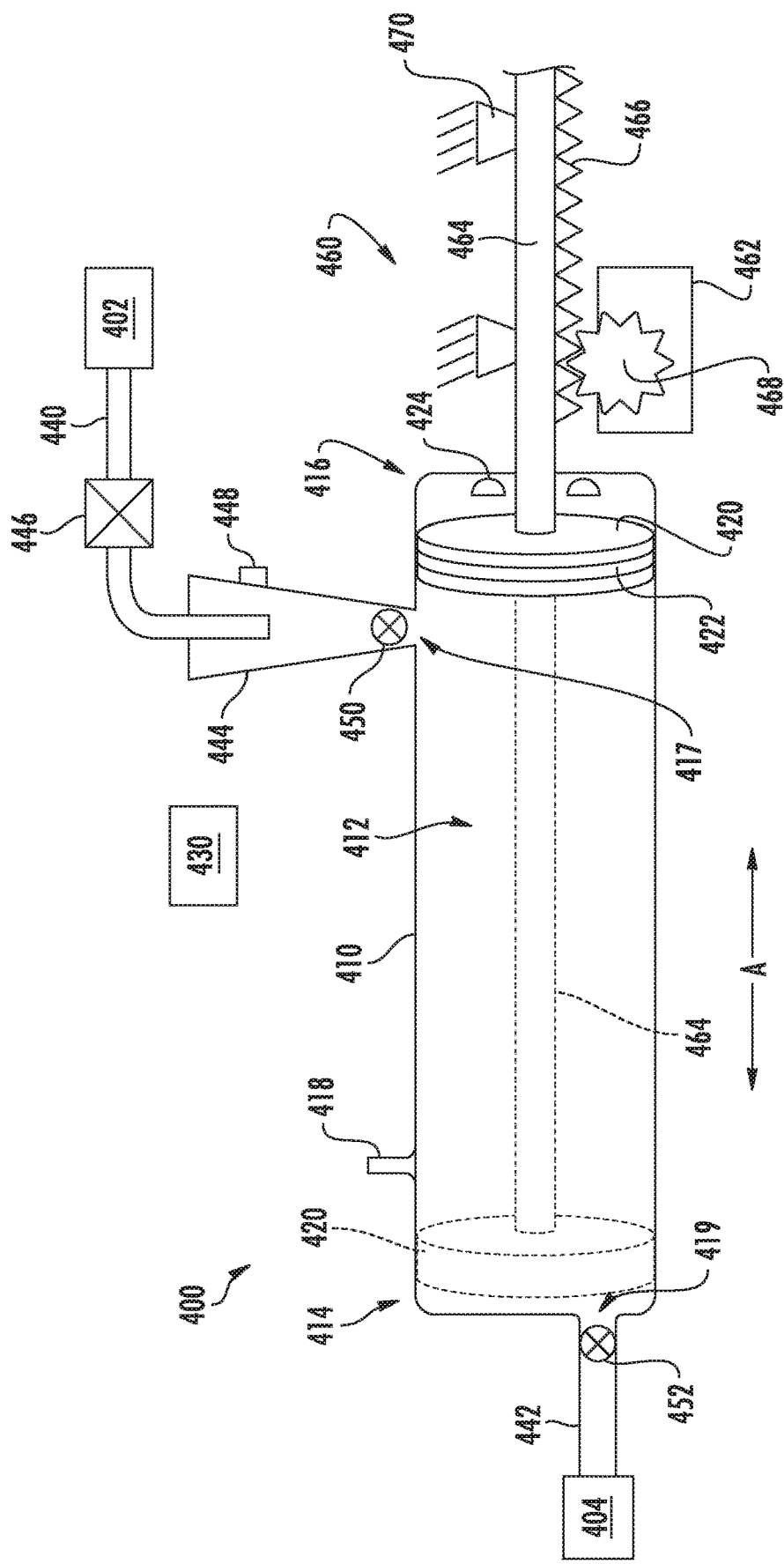
FIG. 9 provides a schematic view of yet another exemplary embodiment of a precise fill dispensing system according to an exemplary embodiment of the present subject matter.

FIG. 9 provides a schematic view of yet another exemplary embodiment of a precise fill dispensing system 400 according to an exemplary embodiment of the present subject matter. Generally, like dispensing system 200 of FIGS. 4 through 6 and dispensing system 300 of FIGS. 7 and 8, dispensing system 400 is operable to dispense a precise or controlled volume of water from a water supply 402 to a downstream assembly 404. For instance, dispensing system 400 may be employed to deliver a precise or controlled volume of water from a water supply line (i.e., the water supply) to ice making assembly 170 of FIG. 3 (i.e., the downstream assembly) of refrigerator appliance 100 (FIG. 1). However, as will be appreciated, the exemplary dispensing system 400 may be employed to deliver a precise or controlled volume of water to other downstream assemblies of an appliance, such as e.g., dispensing assembly 140 of refrigerator appliance 100 (FIG. 1), a reservoir of a coffee brewing system, etc. Dispensing system 400 may be located in any suitable location within an appliance, e.g., upstream of ice making assembly 170 within door 128 of refrigerator appliance 100 (FIGS. 1 and 3).

As illustrated in FIG. 9, dispensing system 400 includes a cylinder or housing 410 defining a chamber 412. For this embodiment, chamber 412 of housing 410 is cylindrical. Chamber 412 extends between a first end 414 and a second end 416, e.g., along an axial direction A. For this embodiment, the axial direction A is orthogonal to a vertical direction, such as the vertical direction V shown in FIGS. 1 through 3. Stated differently, dispensing system 400 is oriented horizontally. Chamber 412 of housing 410 has an inlet 417 and an outlet 419. Inlet 417 is positioned at or proximate first end 414 of chamber 412 and outlet 419 of chamber 412 is positioned proximate second end 416, e.g., along the axial direction A.

Dispensing system 400 also includes a piston 420 movable within chamber 412 of housing 410 between a fill position and a discharge position. In FIG. 9, piston 420 is shown in the fill position in solid lines and in the discharge position in phantom lines. Generally, piston 420 is positioned proximate second end 416 of chamber 412 in the fill position and proximate first end 414 in the discharge position. The stroke of piston 420 is the axial distance traveled by piston 420 between the fill and discharge positions. Further, piston 420 has a seal 422 that engages the inner walls defining chamber 412 to seal and fluidly separate first reservoir R1 and second reservoir R2 of chamber 412. For this embodiment, seal 422 is an annular elastomer seal. For instance, seal 422 may be an O-ring formed of a natural or synthetic polymer material, such as e.g., rubber. In some embodiments, piston 420 may include multiple seals 422, e.g., spaced from one another along the axial direction A. Furthermore, in some embodiments, housing 410 includes an ambient port 418 that provides fluid communication (e.g., air communication) between chamber 412 and the ambient air surrounding housing 410. Ambient port 418 allows air to escape from chamber 412 (e.g. to reduce the pressure of the air within chamber 412) when piston 420 is moved from the discharge position to the fill position.

Dispensing system 400 further includes an inlet supply conduit 440 in fluid communication with water supply 402. Dispensing system 400 also includes a standpipe or water fill reservoir 444 in fluid communication with water supply 402 via inlet supply conduit 440. Water fill reservoir 444 is also in fluid communication with chamber 412 of housing 410, and more particularly, inlet 417 of chamber 412. A water valve 446 is positioned along inlet supply conduit 440. Water valve 446 is movable between a closed position and an open position. Water valve 446 is configured to selectively allow fluid to flow from water supply 402 to water fill reservoir 444. For instance, water valve 446 allows for fluid (e.g., water) to flow from water supply 402 to water fill reservoir 444 when in the open position. As further shown in FIG. 9, dispensing system 400 also includes an outlet supply conduit 442 in fluid communication with chamber 412 of housing 410, and more particularly, outlet 419 of chamber 412. Outlet supply conduit 442 is also in fluid communication with downstream assembly 404. Accordingly, outlet supply conduit 442 fluidly connects chamber 412 with downstream assembly 404.

A sensor 448 is positioned proximate water fill reservoir 444 and is operable to detect a water level of the water within water fill reservoir 444, and consequently, sensor 448 is operable to detect the volume of water within chamber 412 as well. That is, if the water level within water fill reservoir 444 is filled to a predetermined water level, chamber 412 is filled with water. Sensor 448 may be any suitable type of water level sensor, such as e.g., a float sensor, an infrared sensor, etc. A processing device or controller 430 is communicatively coupled with sensor 448, as well as water valve 446 and other components of dispensing system 400. Controller 430 may be configured in a similar manner as controller 164 of refrigerator appliance 100 (FIG. 1). In some embodiments, controller 430 may be controller 164. Controller 430 may receive one or more signals from sensor 448 indicating that the water level within water fill reservoir 444 has reached a predetermined water level. In this way, controller 430 may activate other components of dispensing system 400 such that dispensing system 400 dispenses a precise or controlled volume of water to downstream assembly 404.

As further shown in FIG. 9, for this embodiment, dispensing system 400 includes an inlet check valve 450 positioned at inlet 417 of chamber 412 where water fill reservoir 444 and chamber 412 fluidly connect. Inlet check valve 450 is operable to prevent water backflow from chamber 412 into water fill reservoir 444, e.g., when piston 420 is moved from the fill position to the discharge position. Moreover, dispensing system 400 includes an outlet check valve 452 positioned at outlet 419 of chamber 412 where chamber 412 and outlet supply conduit 442 fluidly connect. Outlet check valve 452 is operable to prevent water backflow from outlet supply conduit 442 into chamber 412, e.g., when piston 420 is moved from the fill position to the discharge position.

Dispensing system 400 also includes a drive assembly 460. Drive assembly 460 includes a drive motor 462 operatively coupled with piston 420 for driving piston 420 from the fill position to the discharge position such that fluid (e.g., water) is dispensed from chamber 412 to downstream assembly 404 via outlet supply conduit 442. Drive motor 462 is also operable to retract or move piston 420 from the discharge position to the fill position, e.g., along the axial direction A. Drive motor 462 may be an electric motor, for example. Drive motor 462 is communicatively coupled with controller 430. Thus, drive motor 462 may be controlled by controller 430. Specifically, controller 430 can control drive motor 462 to ultimately control the displacement of piston 420 and thus the volume of water dispensed to downstream assembly 404. In some embodiments, controller 430 may control drive motor 462 to control the stroke of piston 420 such that variable amounts of water may be dispensed by dispensing system 400.

Piston 420 is coupled with or connected to a drive shaft 464 of drive assembly 460 that extends out of chamber 412 of housing 410, e.g., out of second end 416. A seal 424 prevents water from leaking from chamber 412 and allows for axial movement of drive shaft 464. Seal 424 may be an O-ring formed of an elastomer material, for example. For this embodiment, drive shaft 464 is operatively coupled with drive motor 462. More particularly, as shown in FIG. 9, drive shaft 464 has a track 466 having a plurality of teeth. The teeth of the track 466 are spaced from one another along the axial direction A. Drive motor 462 has a coupling 468 having a plurality of teeth. The plurality of teeth of coupling 468 are in meshing engagement with the plurality of teeth of track 466. Thus, when drive motor 462 drives coupling 468 about an axis of rotation (e.g., an axis extending into and out of the page in FIG. 9 and perpendicular to the axial direction A), coupling 468 in turn drives track 466 of drive shaft 464 such that drive shaft 464 and piston 420 connected thereto are translated along the axial direction A. In this way, piston 420 may be moved between the fill and discharge positions. Moreover, as shown in FIG. 9, one or more bearings 470 may support the drive shaft 464, e.g., radially.

An exemplary manner in which dispensing system 400 may dispense a precise or controlled volume of water to downstream assembly 404 will now be described. The precise fill dispense process may be initiated by controller 430 receiving a fill command signal. For instance, controller 430 may receive a fill command signal from a sensor of downstream assembly 404. As one example, downstream assembly 404 may be the ice making assembly 170 of FIG. 3. A sensor of ice making assembly 170 may indicate, via the fill command signal, that water is needed within mold cavity 176 of resilient mold 174 so that new ice cubes can be formed.

After receiving the fill command signal, controller 430 first determines whether chamber 412 is filled with water. For instance, controller 430 may receive, from sensor 448, a signal indicating whether the water level within water fill reservoir 444 has reached a predetermined water level. If the water level within water fill reservoir 444 has not reached the predetermined water level, controller 230 activates water valve 446 to move to the open position to allow fluid (e.g., water) to flow from water supply 402 into chamber 412 of housing 410 via inlet supply conduit 440. Controller 430 continues receiving signals indicating whether the water level within water fill reservoir 444 has reached the predetermined water level. When the water level within water fill reservoir 444 has reached the predetermined water level, controller 230 controls water valve 446 to move to a closed position, e.g., so that the volume of water within chamber 412 is known and so that water does not overflow from water fill reservoir 444. If controller 430 initially determines that the water level within water fill reservoir 444 is at the predetermined water level, controller 430 does not activate water valve 446 to the open position and continues with the dispensing process as described below. The default position of piston 420 is the fill position and after each stroke in which piston 420 is moved from the fill position to the discharge position, piston 420 is moved or retracted to the fill position by drive assembly 460.

To dispense a precise or controlled volume of water to downstream assembly 404, controller 430 is configured to activate drive motor 462 to move piston 420 from the fill position to the discharge position such that water is dispensed from chamber 412 to downstream assembly 404 via outlet supply conduit 442. The speed, torque, time "ON", or some other parameter of drive motor 462 can be controlled such that piston 420 displaces the desired volume of water to downstream assembly 404. As one example, controller 430 may control drive motor 462 to move piston 420 midway between the fill and discharge positions to dispense a first volume of water. As another example, controller 430 may control drive motor 462 to move piston 420 to a fully discharged position in which piston 420 is moved to first end 414 of chamber 412 to dispense a second volume of water, which is a volume greater than the first volume of water. After dispensing water from chamber 412, controller 430 is configured to activate drive motor 462 to move piston 420 from the discharge position to the fill position. The process may be repeated as many times as necessary to dispense the required volume of water to downstream assembly 404.

Figure 10:
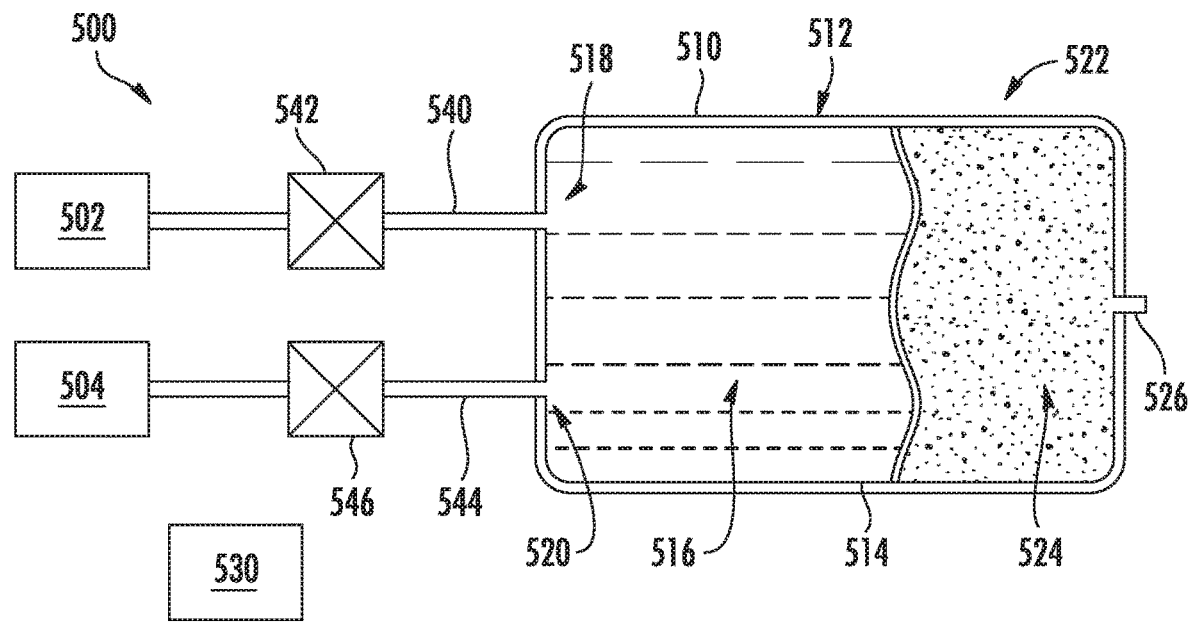
FIG. 10 provides a schematic view of a further exemplary embodiment of a precise fill dispensing system according to an exemplary embodiment of the present subject matter.

FIG. 10 provides a schematic view of another exemplary embodiment of a precise fill dispensing system 500 according to an exemplary embodiment of the present subject matter. Generally, like dispensing system 200 of FIGS. 4 through 6, dispensing system 300 of FIGS. 7 and 8, and dispensing system 400 of FIG. 9, dispensing system 500 is operable to dispense a precise or controlled volume of water from a water supply 502 to a downstream assembly 504. For instance, dispensing system 500 may be employed to deliver a precise or controlled volume of water from a water supply line (i.e., the water supply) to ice making assembly 170 of FIG. 3 (i.e., the downstream assembly) of refrigerator appliance 100 (FIG. 1). However, as will be appreciated, the exemplary dispensing system 500 may be employed to deliver a precise or controlled volume of water to other downstream assemblies of an appliance, such as e.g., dispensing assembly 140 of refrigerator appliance 100 (FIG. 1), a reservoir of a coffee brewing system, etc. Dispensing system 500 may be located in any suitable location within an appliance, e.g., upstream of ice making assembly 170 within door 128 of refrigerator appliance 100 (FIGS. 1 and 3).

As shown in FIG. 10, dispensing assembly 500 includes an expansion tank 510 defining an interior volume 512 containing a flexible bladder 514. Flexible bladder 514 defines a water chamber 516 having an inlet 518 and an outlet 520. Water chamber 516 may filled with water. An expansion mechanism 522 is disposed within interior volume 512 of expansion tank 510 and is operable to cushion shock caused by water hammer (e.g., when water flows into water chamber 616) and to allow for expansion of water into water chamber 516, e.g., during thermal expansion. Particularly, for this embodiment, expansion mechanism 522 is an air chamber 524 defined by the flexible bladder 514. Air chamber 524 is filled with pressurized air. For instance, expansion tank 510 includes a pressuring port 526 that provides access to air chamber 524, e.g., for pressurizing air chamber 524.

As further depicted in FIG. 10, dispensing assembly 500 includes an inlet supply conduit 540 in fluid communication with water supply 502 and inlet 518 of water chamber 516. An inlet valve 542 is positioned along inlet supply conduit 540 and is movable between a closed position and an open position. Inlet valve 542 is configured to allow fluid to flow from water supply 502 to water chamber 516 of flexible bladder 514 when inlet valve 542 is in the open position. Dispensing assembly 500 also includes an outlet supply conduit 544 in fluid communication with outlet 520 of water chamber 516 and downstream assembly 504. An outlet valve 546 is positioned along outlet supply conduit 544 and is movable between a closed position and an open position. Outlet valve 546 is configured to allow fluid to flow from water chamber 516 to downstream assembly 504 when in the open position. For this embodiment, inlet valve 542 and outlet valve 546 are solenoid valves that are normally closed valves. In alternative embodiments, inlet valve 542 and outlet valve 546 may be other suitable types of valves.

Dispensing assembly 500 also includes a controller 530. Controller 530 is communicatively coupled with inlet valve 542 and outlet valve 546. Controller 530 may be configured in a similar manner as controller 164 of refrigerator appliance 100 (FIG. 1). In some embodiments, controller 530 may be controller 164. Controller 530 may receive and may send one or more signals to and from inlet valve 542 and outlet valve 546. For instance, controller 530 may activate one or both of inlet valve 542 and outlet valve 546 to move to the open or closed position.

An exemplary manner in which dispensing system 500 may dispense a precise or controlled volume of water to downstream assembly 504 will now be described. The precise fill dispense process may be initiated by controller 530 receiving a fill command signal. For instance, controller 530 may receive a fill command signal from a sensor of downstream assembly 504 indicating that a particular volume of water is required. As one example, downstream assembly 204 may be the ice making assembly 170 of FIG. 3. A sensor of ice making assembly 170 may indicate, via the fill command signal, that water is needed within mold cavity 176 of resilient mold 174 so that new ice cubes can be formed.

For this example, inlet valve 542 is a normally open valve and outlet valve 546 is a normally closed valve. After receiving the fill command signal, controller 530 activates the inlet valve 542 to move to the closed position, and at the same time, activates outlet valve 546 to move to the open position. When inlet valve 542 is moved to the closed position, water is prevented from flowing from water supply 502 to water chamber 516 along inlet supply conduit 540. When outlet valve 546 is moved to the open position, water flows from water chamber 516 through outlet valve 546 and to downstream assembly 504 along outlet supply conduit 544. Particularly, when inlet valve 542 closes and outlet valve 546 opens, a precise or controlled volume of water is dispensed to downstream assembly 504 regardless of the incoming water pressure from water supply 502. Controller 530 may activate outlet valve 546 to the open position for a predetermined valve open time (and may activate inlet valve 542 to the closed position for a predetermined valve closed time). The predetermined time may be associated with a predetermined volume of water, e.g., to dispense. For instance, controller 530 may include a lookup table that associates water dispense volumes with a predetermined valve open time. Thus, to dispense a particular volume of water, controller 530 may determine the predetermined valve open time to keep outlet valve 546 open and may keep outlet valve 546 open for the determined predetermined valve open time, e.g., to dispense the required or commanded predetermined volume of water.

After dispensing system 500 dispenses the precise or controlled volume of water to downstream assembly 504, controller 530 controls outlet valve 546 from the open position to the closed position and controls inlet valve 542 from the closed position to the open position. Accordingly, water is prevented from flowing from water chamber 516 to downstream assembly 504 and water is permitted to flow from water supply 502 to water chamber 516 of flexible bladder 514. Thus, the incoming water may expand water chamber 516 and compress the pressurized air within air chamber 524 of flexible bladder 514. The compressibility of the air within air chamber 524 cushions shock caused by water hammer and absorbs excess water pressure caused by thermal expansion.

Figure 11:
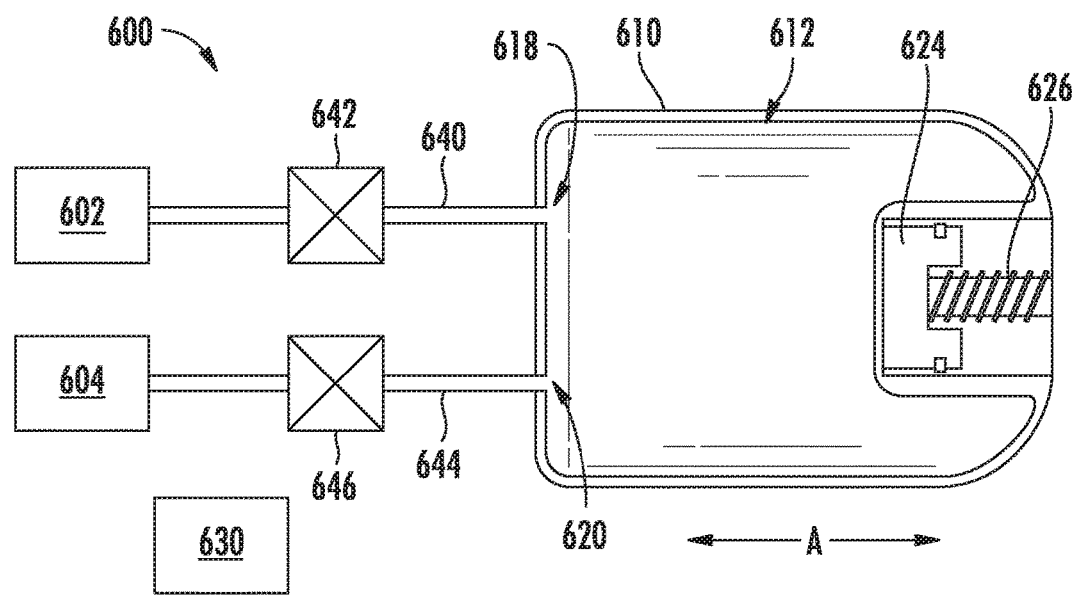
FIG. 11 provides a schematic view of yet another exemplary embodiment of a precise fill dispensing system according to an exemplary embodiment of the present subject matter.

FIG. 11 provides a schematic view of another exemplary embodiment of a precise fill dispensing system 600 according to an exemplary embodiment of the present subject matter. Generally, like dispensing system 200 of FIGS. 4 through 6, dispensing system 300 of FIGS. 7 and 8, dispensing system 400 of FIG. 9, and dispensing system 500 of FIG. 10, dispensing system 600 is operable to dispense a precise or controlled volume of water from a water supply 602 to a downstream assembly 604. For instance, dispensing system 600 may be employed to deliver a precise or controlled volume of water from a water supply line (i.e., the water supply) to ice making assembly 170 of FIG. 3 (i.e., the downstream assembly) of refrigerator appliance 100 (FIG. 1). However, as will be appreciated, the exemplary dispensing system 600 may be employed to deliver a precise or controlled volume of water to other downstream assemblies of an appliance, such as e.g., dispensing assembly 140 of refrigerator appliance 100 (FIG. 1), a reservoir of a coffee brewing system, etc. Dispensing system 600 may be located in any suitable location within an appliance, e.g., upstream of ice making assembly 170 within door 128 of refrigerator appliance 100 (FIGS. 1 and 3).

As depicted in FIG. 11, dispensing assembly 600 includes an expansion tank 610 defining an interior volume 612 containing a flexible bladder 614. Flexible bladder 614 defines a water chamber 616 having an inlet 618 and an outlet 620. Water chamber 616 may filled with water. An expansion mechanism 622 is disposed within interior volume 612 of expansion tank 610 and is operable to allow for expansion of water into water chamber 616 and cushions shock caused by water hammer. Particularly, for this embodiment, expansion mechanism 622 includes a piston 624 and a spring 626 operatively coupled with piston 624. Piston 624 is movable along an axial direction A. That is, piston 624 may reciprocate along the axial direction A. Spring 626 biases piston 624 such that piston 624 interacts with flexible bladder 614 (either directly or indirectly). Piston 624 is movable along the axial direction A to absorb water hammer or excessive pressure shocks.

As further depicted in FIG. 11, dispensing assembly 600 includes an inlet supply conduit 640 in fluid communication with water supply 602 and inlet 618 of water chamber 616. An inlet valve 642 is positioned along inlet supply conduit 640 and is movable between a closed position and an open position. Inlet valve 642 is configured to allow fluid to flow from water supply 602 to water chamber 616 of flexible bladder 614 when inlet valve 642 is in the open position. Dispensing assembly 600 also includes an outlet supply conduit 644 in fluid communication with outlet 620 of water chamber 616 and downstream assembly 604. An outlet valve 646 is positioned along outlet supply conduit 644 and is movable between a closed position and an open position. Outlet valve 646 is configured to allow fluid to flow from water chamber 616 to downstream assembly 604 when in the open position. For this embodiment, inlet valve 642 and outlet valve 646 are solenoid valves that are normally closed valves. In alternative embodiments, inlet valve 642 and outlet valve 646 may be other suitable types of valves.

Dispensing assembly 600 also includes a controller 630. Controller 630 is communicatively coupled with inlet valve 642 and outlet valve 646. Controller 630 may be configured in a similar manner as controller 164 of refrigerator appliance 100 (FIG. 1). In some embodiments, controller 630 may be controller 164. Controller 630 may receive and may send one or more signals to and from inlet valve 642 and outlet valve 646. For instance, controller 630 may activate one or both of inlet valve 642 and outlet valve 646 to move to the open or closed position.

An exemplary manner in which dispensing system 600 may dispense a precise or controlled volume of water to downstream assembly 604 will now be described. The precise fill dispense process may be initiated by controller 630 receiving a fill command signal. For instance, controller 630 may receive a fill command signal from a sensor of downstream assembly 604 indicating that a particular volume of water is required. As one example, downstream assembly 204 may be the ice making assembly 170 of FIG. 3. A sensor of ice making assembly 170 may indicate, via the fill command signal, that water is needed within mold cavity 176 of resilient mold 174 so that new ice cubes can be formed.

For this example, inlet valve 642 is a normally open valve and outlet valve 646 is a normally closed valve. After receiving the fill command signal, controller 630 activates the inlet valve 642 to move to the closed position, and simultaneously, activates outlet valve 646 to move to the open position. When inlet valve 642 is moved to the closed position, water is prevented from flowing from water supply 602 to water chamber 616 along inlet supply conduit 640. When outlet valve 646 is moved to the open position, water flows from water chamber 616 through outlet valve 646 and to downstream assembly 604 along outlet supply conduit 644. Particularly, when inlet valve 642 closes and outlet valve 646 opens, a precise or controlled volume of water is dispensed to downstream assembly 604 regardless of the incoming water pressure from water supply 602. Controller 630 may activate outlet valve 646 to the open position for a predetermined valve open time (and may activate inlet valve 642 to the closed position for a predetermined valve closed time). The predetermined time may be associated with a predetermined volume of water, e.g., to dispense. For instance, controller 630 may include a lookup table that associates water dispense volumes with a predetermined valve open time. Thus, to dispense a particular volume of water, controller 630 may determine the predetermined valve open time to keep outlet valve 646 open and may keep outlet valve 646 open for the determined predetermined valve open time, e.g., to dispense the required or commanded predetermined volume of water.

After dispensing system 600 dispenses the precise or controlled volume of water to downstream assembly 604, controller 630 controls outlet valve 646 from the open position to the closed position and controls inlet valve 642 from the closed position to the open position. Accordingly, water is prevented from flowing from water chamber 616 to downstream assembly 604 and water is permitted to flow from water supply 602 to water chamber 616 of flexible bladder 614. Thus, the incoming water may expand water chamber 616. Piston 624 and spring 626 cushion the shock caused by water hammer and absorbs excess water pressure caused by thermal expansion of water within water chamber 616.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dispensing system for dispensing fluid to a downstream assembly of an appliance, the dispensing system comprising:
   a housing defining a chamber;
   a piston movable within the chamber of the housing between a first position and a second position, the piston fluidly separating a first reservoir and a second reservoir of the chamber;
   a first inlet conduit in fluid communication with a water supply and the first reservoir of the chamber;
   a first valve positioned along the first inlet conduit and movable between an open position and a closed position, the first valve configured to selectively allow fluid to flow from the water supply to the first reservoir of the chamber;
   a second inlet conduit in fluid communication with the water supply and the second reservoir of the chamber;
   a second valve positioned along the second inlet conduit and movable between an open position and a closed position, the second valve configured to selectively allow fluid to flow from the water supply to the second reservoir of the chamber;
   a first outlet conduit in fluid communication with the first reservoir of the chamber and the downstream assembly;
   a third valve positioned along the first outlet conduit and movable between an open position and a closed position, the third valve configured to selectively allow fluid to flow from the first reservoir to the downstream assembly;
   a second outlet conduit in fluid communication with the second reservoir of the chamber and the downstream assembly;
   a fourth valve positioned along the second outlet conduit and movable between an open position and a closed position, the fourth valve configured to selectively allow fluid to flow from the second reservoir to the downstream assembly;
   a sensor positioned at or proximate one of the first position and the second position, the sensor operable to detect the piston when the piston is in the one of the first position and the second position within the chamber; and
   a controller communicatively coupled with the first valve, the second valve, the third valve, the fourth valve, and the sensor, the controller configured to:
      receive a fill command signal;
      receive a location signal from the sensor indicating a position of the piston;
      control the first valve to the open position to allow fluid to flow from the water supply to the first reservoir of the chamber, wherein the piston is moved from the first position to the second position when the first valve is moved to the open position; and
      control the fourth valve to the open position to allow fluid to flow from the second reservoir of the chamber to the downstream assembly.

2. The dispensing system of claim 1, further comprising:
   a first stop positioned within the first reservoir of the chamber, the first stop operable to stop the piston in the first position; and
   a second stop positioned within the second reservoir of the chamber, the second stop operable to stop the piston in the second position.

3. The dispensing system of claim 2, wherein the chamber of the housing extends between a first end and a second end, and wherein the first inlet conduit and the first outlet conduit both fluidly connect with the first reservoir of the chamber between the first end and the first stop and the second inlet conduit and the second outlet conduit both fluidly connect with the second reservoir of the chamber between the second end and the second stop.

4. The dispensing system of claim 1, wherein the piston has a magnet and the sensor is a hall-effect sensor operable to detect the magnet when the piston is positioned in one of the first position and the second position.

5. The dispensing system of claim 1, wherein the sensor is a first sensor positioned at the first position and wherein the dispensing system further comprises:
   a second sensor positioned at the second position.

6. The dispensing system of claim 1, wherein the controller is further configured to:
   receive a location signal from the sensor indicating that the piston is in the second position;
   control the first valve to the closed position and the fourth valve to the closed position;
   control the second valve to the open position to allow fluid to flow from the water supply to the second reservoir of the chamber, wherein the piston is moved from the second position to the first position when the second valve is moved to the open position; and
   control the third valve to the open position to allow fluid to flow from the first reservoir of the chamber to the downstream assembly.

7. The dispensing system of claim 1, wherein the first valve, the second valve, the third valve, and the fourth valve are normally closed valves.

8. The dispensing system of claim 1, wherein the downstream assembly is an ice making assembly and the appliance is a refrigerator appliance.

9. The dispensing system of claim 1, wherein the piston has an annular elastomer seal that fluidly separates the first reservoir from the second reservoir of the chamber.

10. A refrigerator appliance, comprising:
    an ice making assembly;
    a dispensing system for dispensing fluid to the ice making assembly, the dispensing system comprising:
       a housing defining a chamber;
       a piston movable within the chamber of the housing between a first position and a second position, the piston fluidly separating a first reservoir and a second reservoir of the chamber;
       a first inlet conduit in fluid communication with a water supply and the first reservoir of the chamber;
       a first valve positioned along the first inlet conduit and movable between an open position and a closed position, the first valve configured to selectively allow fluid to flow from the water supply to the first reservoir of the chamber;

a second inlet conduit in fluid communication with the water supply and the second reservoir of the chamber;
a second valve positioned along the second inlet conduit and movable between an open position and a closed position, the second valve configured to selectively allow fluid to flow from the water supply to the second reservoir of the chamber;
a first outlet conduit in fluid communication with the first reservoir of the chamber and the ice making assembly;
a third valve positioned along the first outlet conduit and movable between an open position and a closed position, the third valve configured to selectively allow fluid to flow from the first reservoir to the ice making assembly;
a second outlet conduit in fluid communication with the second reservoir of the chamber and the ice making assembly;
a fourth valve positioned along the second outlet conduit and movable between an open position and a closed position, the fourth valve configured to selectively allow fluid to flow from the second reservoir to the ice making assembly;
a sensor positioned at or proximate one of the first position and the second position, the sensor operable to detect the piston when the piston is in the one of the first position and the second position within the chamber; and
a controller communicatively coupled with the first valve, the second valve, the third valve, the fourth valve, and the sensor, the controller configured to:
receive a fill command signal;
receive a location signal from the sensor indicating a position of the piston;
control the first valve to the open position to allow fluid to flow from the water supply to the first reservoir of the chamber, wherein the piston is moved from the first position to the second position when the first valve is moved to the open position; and
control the fourth valve to the open position to allow fluid to flow from the second reservoir of the chamber to the ice making assembly.

11. The refrigerator appliance of claim 10, wherein the dispensing assembly further comprises:
a first stop positioned within the first reservoir of the chamber, the first stop operable to stop the piston in the first position; and
a second stop positioned within the second reservoir of the chamber, the second stop operable to stop the piston in the second position.

12. The refrigerator appliance of claim 11, wherein the dispensing assembly further comprises, wherein the chamber of the housing extends between a first end and a second end, and wherein the first inlet conduit and the first outlet conduit both fluidly connect with the first reservoir of the chamber between the first end and the first stop and the second inlet conduit and the second outlet conduit both fluidly connect with the second reservoir of the chamber between the second end and the second stop.

13. The refrigerator appliance of claim 10, wherein the piston has a magnet and the sensor is a hall-effect sensor operable to detect the magnet when the piston is positioned in one of the first position and the second position.

14. The refrigerator appliance of claim 10, wherein the sensor is a first sensor positioned at the first position and wherein the dispensing system further comprises:
a second sensor positioned at the second position.

15. The refrigerator appliance of claim 10, wherein the controller is further configured to:
receive a location signal from the sensor indicating that the piston is in the second position;
control the first valve to the closed position and the fourth valve to the closed position;
control the second valve to the open position to allow fluid to flow from the water supply to the second reservoir of the chamber, wherein the piston is moved from the second position to the first position when the second valve is moved to the open position; and
control the third valve to the open position to allow fluid to flow from the first reservoir of the chamber to the downstream assembly.

16. A refrigerator appliance, comprising:
an ice making assembly;
a dispensing system for dispensing fluid to the ice making assembly, the dispensing system comprising:
a housing defining a chamber;
a piston movable within the chamber of the housing between a first position and a second position, the piston fluidly separating a first reservoir and a second reservoir of the chamber;
a first inlet conduit in fluid communication with a water supply and the first reservoir of the chamber;
a first valve positioned along the first inlet conduit and movable between an open position and a closed position, the first valve configured to selectively allow fluid to flow from the water supply to the first reservoir of the chamber;
a second inlet conduit in fluid communication with the water supply and the second reservoir of the chamber;
a second valve positioned along the second inlet conduit and movable between an open position and a closed position, the second valve configured to selectively allow fluid to flow from the water supply to the second reservoir of the chamber;
a first outlet conduit in fluid communication with the first reservoir of the chamber and the ice making assembly;
a third valve positioned along the first outlet conduit and movable between an open position and a closed position, the third valve configured to selectively allow fluid to flow from the first reservoir to the ice making assembly;
a second outlet conduit in fluid communication with the second reservoir of the chamber and the ice making assembly;
a fourth valve positioned along the second outlet conduit and movable between an open position and a closed position, the fourth valve configured to selectively allow fluid to flow from the second reservoir to the ice making assembly;
a first sensor positioned at or proximate the first position, the first sensor operable to detect the piston when the piston is in the first position within the chamber;
a second sensor positioned at or proximate the second position, the second sensor operable to detect the piston when the piston is in the second position within the chamber; and a controller communicatively coupled with the first valve, the second valve, the third valve, the fourth valve, the first sensor, and the second sensor, the controller configured to:
receive a fill command signal;
receive a first location signal from the first sensor indicating that the piston is in the first position;
control the first valve to the open position to allow fluid to flow from the water supply to the first reservoir of the chamber based on the first location signal, wherein the piston is moved from the first position to the second position when the first valve is moved to the open position;
control the fourth valve to the open position to allow fluid to flow from the second reservoir of the chamber to the ice making assembly based on the first location signal;
receive a second location signal from the second sensor indicating that the piston is in the second position;
control the first valve to the closed position and the fourth valve to the closed position based on the second location signal;
control the second valve to the open position to allow fluid to flow from the water supply to the second reservoir of the chamber based on the second location signal, wherein the piston is moved from the second position to the first position when the second valve is moved to the open position; and
control the third valve to the open position to allow fluid to flow from the first reservoir of the chamber to the downstream assembly based on the second location signal.

17. The refrigerator appliance of claim 16, wherein the dispensing assembly further comprises:
a first stop positioned within the first reservoir of the chamber, the first stop operable to stop the piston in the first position; and
a second stop positioned within the second reservoir of the chamber, the second stop operable to stop the piston in the second position.

18. The refrigerator appliance of claim 17, wherein the dispensing assembly further comprises, wherein the chamber of the housing extends between a first end and a second end, and wherein the first inlet conduit and the first outlet conduit both fluidly connect with the first reservoir of the chamber between the first end and the first stop and the second inlet conduit and the second outlet conduit both fluidly connect with the second reservoir of the chamber between the second end and the second stop.

19. The refrigerator appliance of claim 16, wherein the piston has an annular elastomer seal.

20. The refrigerator appliance of claim 16, wherein the piston has a magnet and the first sensor and the second sensor are hall-effect sensors.

* * * * *